United States Patent
Niinuma et al.

(10) Patent No.: US 7,907,754 B2
(45) Date of Patent: Mar. 15, 2011

(54) BIOLOGICAL DETECTION DEVICE, FINGERPRINT AUTHENTICATION DEVICE, AND BIOLOGICAL DETECTION METHOD

(75) Inventors: Koichiro Niinuma, Kawasaki (JP); Takashi Shinzaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 913 days.

(21) Appl. No.: 11/456,656

(22) Filed: Jul. 11, 2006

(65) Prior Publication Data

US 2007/0215558 A1 Sep. 20, 2007

(30) Foreign Application Priority Data

Mar. 17, 2006 (JP) ................... 2006-073831

(51) Int. Cl.
  *G06K 9/00* (2006.01)
  *G06F 7/04* (2006.01)
  *H01H 9/00* (2006.01)
  *H01H 47/00* (2006.01)
  *A61B 5/05* (2006.01)

(52) U.S. Cl. ........ 382/116; 382/115; 382/124; 340/5.82; 361/189; 600/547

(58) Field of Classification Search .............. 382/115, 382/116, 124
  See application file for complete search history.

(56) References Cited

U.S. PATENT DOCUMENTS

| | | | |
|---|---|---|---|
| 5,990,804 A | 11/1999 | Koyama | |
| 6,393,317 B1* | 5/2002 | Fukuda et al. | 600/547 |
| 6,647,133 B1* | 11/2003 | Morita et al. | 382/124 |
| 7,548,636 B2* | 6/2009 | Shimamura et al. | 382/115 |
| 2003/0165261 A1* | 9/2003 | Johansen et al. | 382/124 |
| 2005/0259850 A1 | 11/2005 | Shimamura et al. | |
| 2006/0034493 A1* | 2/2006 | Shimamura et al. | 382/115 |

FOREIGN PATENT DOCUMENTS

| | | |
|---|---|---|
| EP | 1 302 908 | 4/2003 |
| EP | 1 708 135 | 10/2006 |
| JP | 2-1243 | 1/1990 |
| JP | 6-187430 | 7/1994 |
| JP | 10-165382 | 6/1998 |
| JP | 2000-172833 | 6/2000 |
| JP | 2004-013654 | 1/2004 |
| JP | 2004-258704 | 9/2004 |
| JP | 2004-313459 | 11/2004 |
| JP | 2005-143804 | 6/2005 |

OTHER PUBLICATIONS

Extended European Search Report, mailed Jul. 9, 2007 and issued in corresponding European Patent Application No. 06117532.9-2218.

* cited by examiner

*Primary Examiner* — Tom Y Lu
*Assistant Examiner* — Thomas A Conway
(74) *Attorney, Agent, or Firm* — Fujitsu Patent Center

(57) ABSTRACT

A further object of the present invention is to provide a biological detection device and the like capable of performing processing promptly. An input voltage with a predetermined frequency is output from an oscillating portion. By performing switching using an analog switch, the input voltage is output to an electrode via a first resistance portion. A first comparator detects an output voltage, compares the voltage with a first reference threshold stored in a storage portion, and outputs an output. Furthermore, by performing switching using the analog switch, an input voltage is output to the electrode via a second resistance portion. A second comparator detects an output voltage, compares the voltage with a second reference threshold, and outputs an output. A determination portion determines whether a test body is a living finger or a gummy finger in accordance with a combination of the values of the outputs.

13 Claims, 19 Drawing Sheets

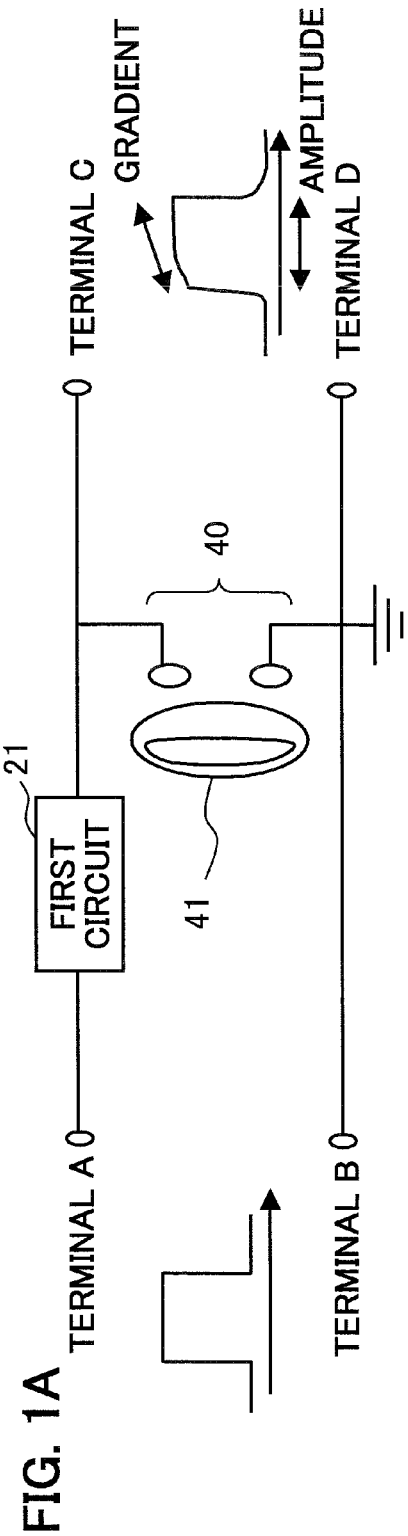
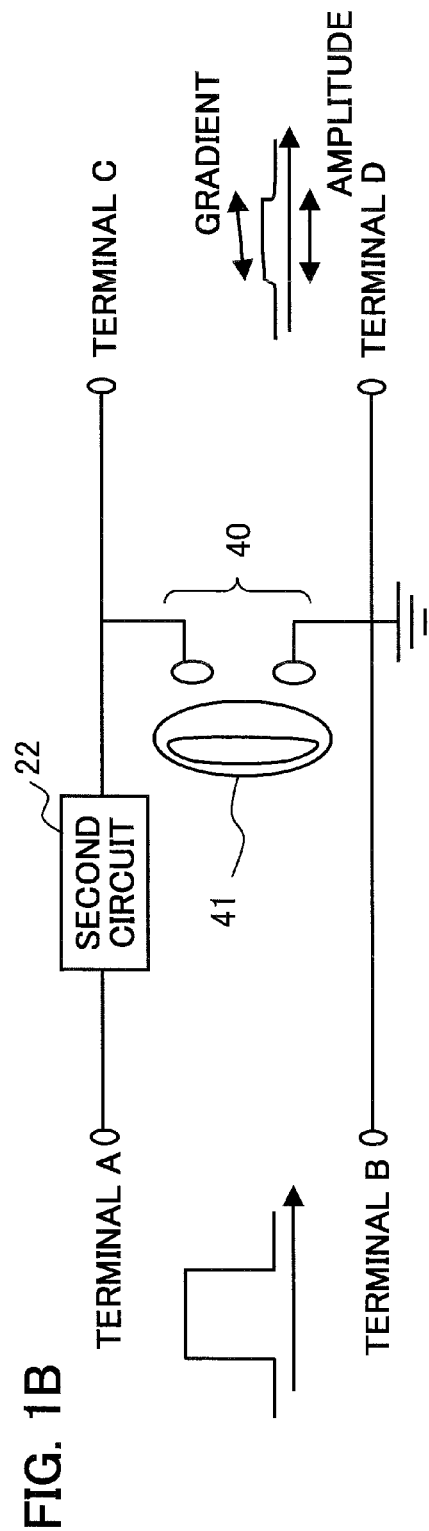

FIG. 6A
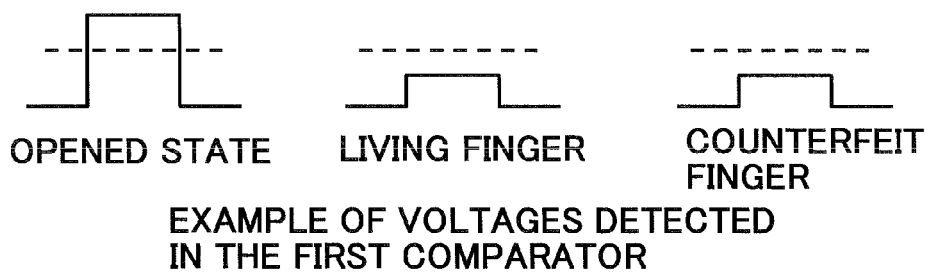
EXAMPLE OF VOLTAGES DETECTED
IN THE FIRST COMPARATOR
FIG. 6B
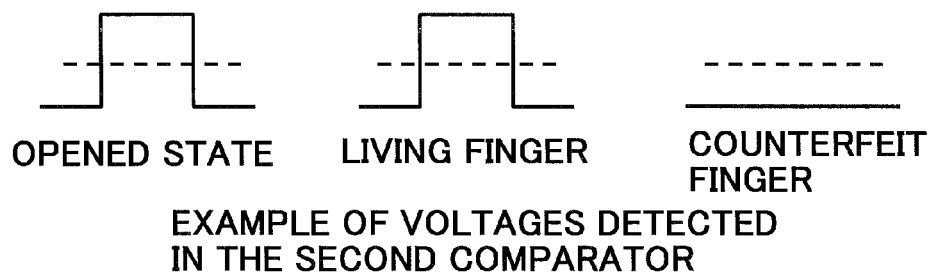
EXAMPLE OF VOLTAGES DETECTED
IN THE SECOND COMPARATOR
FIG. 6C
| OUT1 | 1 | 0 | 1 | 0 |
|---|---|---|---|---|
| OUT2 | 1 | 1 | 0 | 0 |
| TEST BODY | OPENED | LIVING FINGER | × | COUNTERFEIT FINGER |
EXAMPLE OF OUTPUTS OF
THE FIRST AND SECOND COMPARATORS

RANGE OF THE FIRST REFERENCE THRESHOLD

RANGE OF THE SECOND REFERENCE THRESHOLD

CONFIGURATION EXAMPLE OF
THE FINGERPRINT SENSOR MODULE

CONFIGURATION EXAMPLE OF
THE FINGERPRINT SENSOR MODULE

CONFIGURATION EXAMPLE OF
THE FINGERPRINT SENSOR MODULE

CONFIGURATION EXAMPLE OF
THE FINGERPRINT SENSOR MODULE

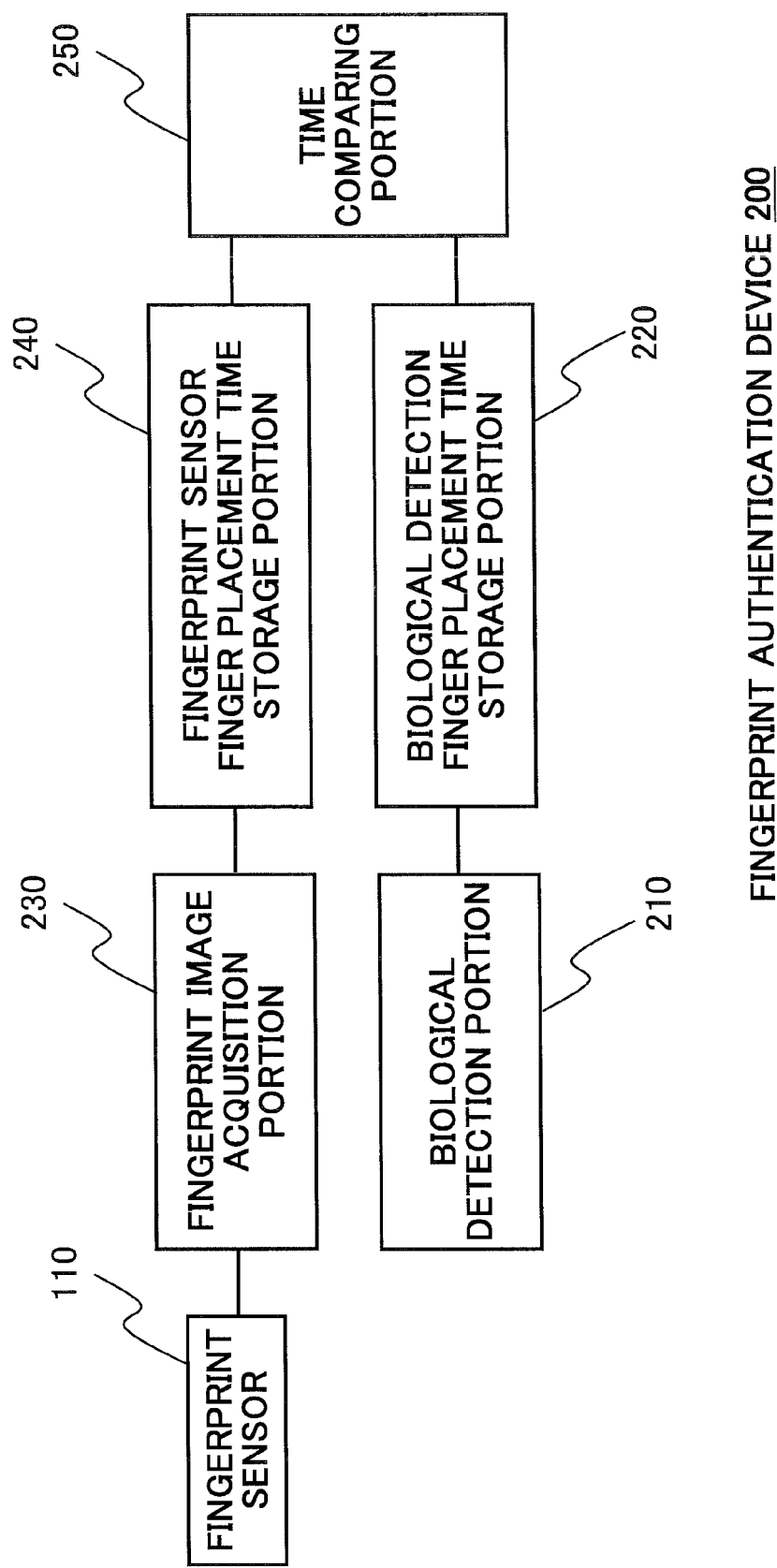

BIOLOGICAL DETECTION DEVICE, FINGERPRINT AUTHENTICATION DEVICE, AND BIOLOGICAL DETECTION METHOD

CROSS-REFERENCE TO RELATED APPLICATIONS

This application is based upon and claims the benefit of priority from the prior Japanese Patent Application No. 2006-073831, filed on Mar. 17, 2006, the entire contents of which are incorporated herein by reference.

BACKGROUND OF THE INVENTION

1. Field of the Invention

The present invention relates to a biological detection device, a fingerprint authentication device, and a biological detection method for discriminating whether a test body is a living body or not. Specifically, the present invention relates to a biological detection device and the like which discriminate a test body with a high degree of accuracy, while achieving reduction of the costs and miniaturization of such devices.

2. Description of the Related Art

In recent years information processing equipment such as a portable phone and PDA (Personal Digital Assistance) are capable of storing a large amount of individual information and also can be connected to networks. Therefore, a higher level of security has been demanded in such information equipment.

In response to such a demand, individual authentication using biological information (biometrics information) has become widely implemented, since passwords or the like could be stolen. Particularly, use of fingerprints as the biological information is highly convenient.

When individual authentication is carried out using fingerprints, a fingerprint (a pattern constituted by ridge lines which contact a fingerprint sensor and valley lines which do not contact) is obtained as image information from a fingerprint sensor, then characteristic information is extracted from the image information, and the extracted characteristic information is compared with a characteristic information of an individual to be authenticated, which is registered in advance. In this way the individual authentication is performed.

However, in recent years an artificial finger with a counterfeit fingerprint has been created and unfairly used. Therefore, when individual authentication is carried out using fingerprints, prevention of improper use of such artificial fingers is strongly desired.

For a conventional technology of preventing improper use of the counterfeit fingerprint, there is disclosed a biological detection device in which a test body oscillating frequency generating portion generates oscillating frequency corresponding to the electrostatic capacity of the test body, and a biological control portion detects whether the test body is a living body or not on the basis a reference signal for judging whether the test body, which is set in advance, is the living body or not (for example, the following Japanese Patent Application Laid-Open No. H10-165382).

Furthermore, there is also disclosed a biological detection device in which a voltage application portion applies two square-wave input voltages having different frequencies to a finger, and impedance of the finger is computed from an output voltage obtained in response to the application of the square-wave input voltages, to check whether the impedance is within the range of stored impedances of the reference living finger, whereby it is determined whether the finger is the living body or not (for example, the following Japanese Patent Application Laid-Open No. 2005-143804).

However, in Japanese Patent Application Laid-Open No. H10-165382, only the electrostatic capacity is used to detect whether the finger is the living body or not. For this reason, for example, if using a gummy matter (a substance obtained by gelling gelatine solution), which strongly resembles human skin, the electrostatic capacity which is close to that of a human finger may be obtained, thus there is a problem that a counterfeit finger can be created relatively easily.

In Japanese Patent Application Laid-Open No. 2005-143804, on the other hand, since the voltages with two different frequencies are applied to a finger from the voltage application portion, two oscillators are required inside the voltage application portion. Moreover, biological determination and the like are required to be performed in accordance with the output voltages of the different frequencies, thus control circuits for performing switching and the like are also required to be installed in a biological determination portion. Therefore, Japanese Patent Application Laid-Open No. 2005-143804 has a problem that miniaturization of the device and reduction of costs are difficult due to a large number of parts. In addition, Japanese Patent Application Laid-Open No. 2005-143804 further has a problem that complicated formulae are required to be executed to compute impedance of the finger, slowing the processing time.

SUMMARY OF THE INVENTION

The present invention is contrived in view of the above problems, and an object thereof is to provide a small and low-cost biological detection device and fingerprint authentication device, as well as a biological detection method, which differentiate, with a high degree of accuracy, whether a test body is a living body or not.

A further object of the present invention is to provide a biological detection device and the like capable of performing processing promptly.

In order to achieve the above objects, the present invention, in a biological detection device, has an oscillating portion which oscillates an input voltage having a specific frequency; a plurality of circuit portions each of which is connected to the oscillating portion; an electrode portion which applies the input voltage to a test body; a circuit switching portion which switches the plurality of circuit portions so as to allow the input voltage to be output to the electrode portion via any one of the circuit portions; and a discriminating portion which discriminates whether the test body is a living body or not, according to an output voltage with respect to the input voltage applied to the test body.

Further, the present invention is the biological detection device in which the electrode portion has a plurality of electrode portions the number of which is same as the number of the plurality of circuit portions, each of the electrode portions is connected to each of the circuit portions, and the discriminating portion discriminates whether the test body is the living body or not according to the output voltage with respect to the input voltage applied to the test body via each of the circuit portions and each of the electrode portions respectively.

Further, the present invention is the biological detection device further having a circuit combination changing portion which changes the connection relation between each of the circuit portions and each of the electrode portions.

Furthermore, the present invention is the biological detection device further having a synchronous control portion which synchronizes combination changing of the connection relation performed by the circuit combination changing portion, and discrimination of the output voltage performed by the discriminating portion in response to the combination changing.

Furthermore, the present invention is the biological detection device further having a storage portion which stores a reference threshold, wherein the discrimination portion determines whether the test body is the living body or not by comparing the reference threshold from the storage portions with the output voltage.

Furthermore, the present invention is the biological detection device in which the discriminating portion has a counterfeit determination portion which determines whether or not the test body is a counterfeit.

Furthermore, the present invention is the biological detection device in which the discriminating portion has a counterfeit determination portion which determines whether or not the test body is a counterfeit, and a biological determination portion which determines whether the test body is the living body or not.

Moreover, the present invention is the biological detection device in which the counterfeit determination portion or the biological determination portion determines whether the test body is the living body or not on the basis of a change in amplitude of the output voltage.

In addition, the present invention is the biological detection device in which each of the circuit portions is comprised of a resistance.

In order to achieve the above objects, the present invention, in a fingerprint authentication device, has a fingerprint sensor which captures an image of a fingerprint of a test body; an oscillating portion which oscillates an input voltage having a specific frequency; a plurality of circuit portions each of which is connected to the oscillating portion; an electrode portion which applies the input voltage to the test body; a circuit switching portion which switches the plurality of circuit portions so as to allow the input voltage to be output to the electrode portion via any one of the circuit portions; and a discriminating portion which discriminates whether the test body is a living body or not, according to an output voltage with respect to the input voltage applied to the test body.

Further, the present invention is the fingerprint authentication device in which the electrode portion and the fingerprint sensor are integrated.

Moreover, in order to achieve the above objects, the present invention is the fingerprint authentication device, having a fingerprint sensor which captures an image of a fingerprint of a test body; a biological detection portion; a fingerprint sensor finger placement time storage portion which stores finger placement time for the test body placed on the fingerprint sensor; a biological-detection finger placement time storage portion which stores a biological-detection finger placement time for the test body placed on the biological detection portion; and a time comparing portion which judges whether or not the test body is properly placed, on the basis of the finger placement on fingerprint sensor time and the biological-detection finger placement time which are stored respectively in the fingerprint sensor finger placement time storage portion and the biological-detection finger placement time storage portion, wherein the biological detection portion has an oscillating portion which oscillates an input voltage having a specific frequency; a plurality of circuit portions each of which is connected to the oscillating portion; an electrode portion which applies the input voltage to the test body; a circuit switching portion which switches the plurality of circuit portions so as to allow the input voltage to be output to the electrode portion via any one of the circuit portions; and a discriminating portion which discriminates whether the test body is a living body or not, according to an output voltage with respect to the input voltage applied to the test body, and the time comparing portion judges whether the test body is placed properly, when the difference between the finger placement on fingerprint sensor time and the biological-detection finger placement time is within a range of constant values.

In addition, in order to achieve the above objects, the present invention, in a biological detection method, having the steps of oscillating an input voltage having a specific frequency from an oscillating portion; outputting the input voltage an electrode portion via any one of a plurality of circuit portions; and discriminating whether a test body is a living body or not, according to an output voltage with respect to the input voltage applied to the test body.

According to the present invention, a small and low-cost biological detection device and fingerprint authentication device, as well as a biological detection method, which differentiate, with a high degree of accuracy, whether a test body is a living body or not, can be provided. Further, according to the present invention, a biological detection device and the like capable of performing processing promptly can be provided.

BRIEF DESCRIPTION OF THE DRAWINGS

FIG. 1A and FIG. 1B are principle diagrams of a present embodiment;

FIG. 6A and FIG. 6B are figures showing examples of a voltage detected by a comparator;

FIG. 6C is a figure showing examples of outputs of the comparator;

FIG. 19 is a figure showing a configuration example of a fingerprint authentication device.

DESCRIPTION OF THE PREFERRED EMBODIMENTS

Hereinafter, best modes for carrying out the present invention are described with reference to the drawings.

FIG. 1A and FIG. 1B are principle diagrams of a present embodiment. As shown in the figures, when an input voltage having a specific frequency is applied to a test body 41 placed on an electrode portion 40, via different circuits (a first circuit 21 and a second circuit 22), different output voltages are obtained. In such a characteristic, if the test body 41 is different, a different value of output voltage can be obtained. In the present embodiment, biological detection is performed using this characteristic.

Figure 2:
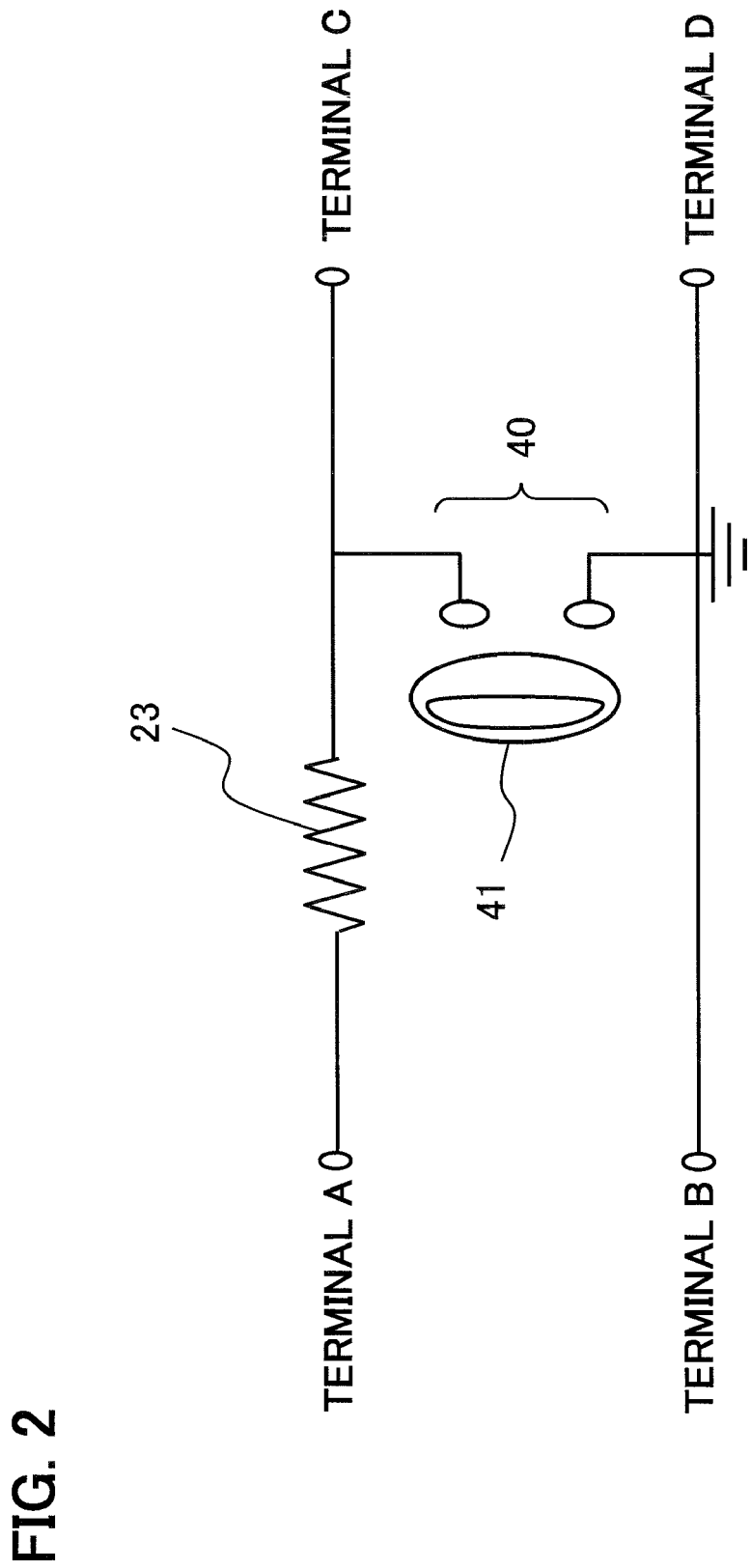
FIG. 2 is a principle diagram of the present embodiment.

FIG. 2 is a principle diagram of a case in which the first circuit 21 or the second circuit 22 is a resistance 23. In a state in which the test body 41 is placed on the electrode portion 40, an input voltage is applied to the test body 41 from terminals A and B via the resistance 23. Then, biological detection is carried out by detecting an output voltage.

Figure 3:
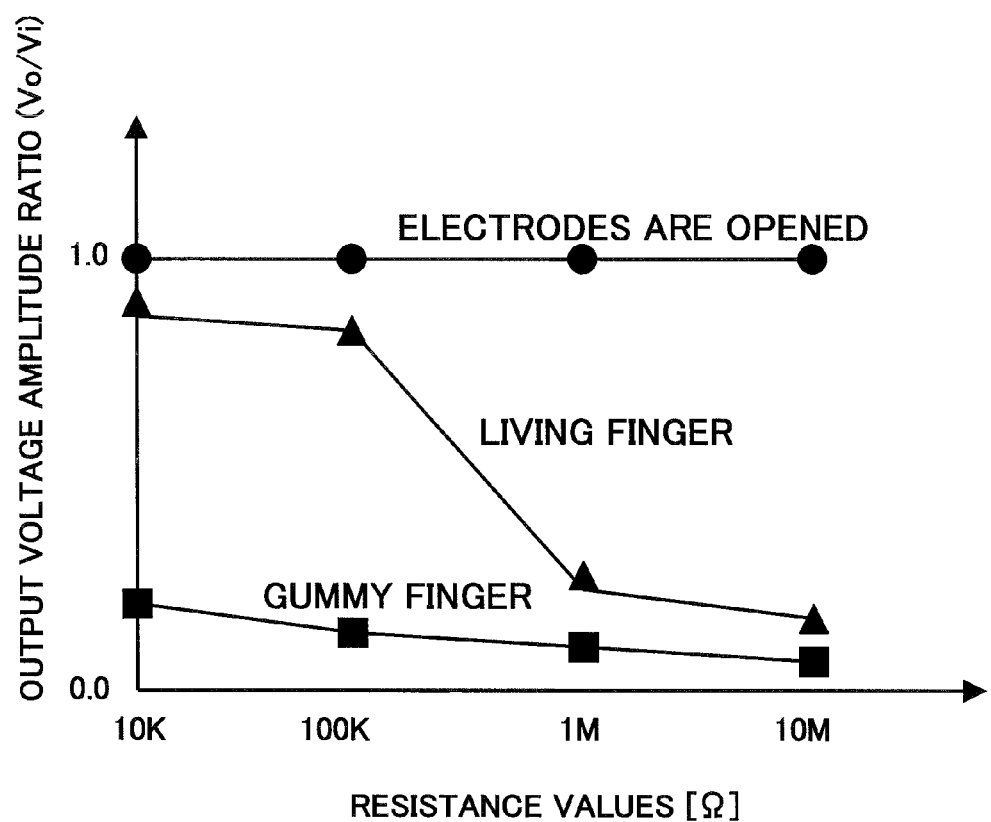
FIG. 3 is a figure showing an experimental result of an output voltage amplitude ratio with respect to a resistance value.

Next, when a resistance value to be applied to the resistance 23 is changed, changes of an output voltage between a living finger and a gummy finger as a counterfeit finger are examined. FIG. 3 shows an experimental result which shows how amplitude of the output voltage changes when the frequency of the input voltage is "1 kHz" and the resistance value of the resistance 23 is changed. In FIG. 3, the vertical axis shows the ratio of amplitudes of the output voltage to amplitudes of the input voltage (Vo/Vin), while the horizontal axis shows values of resistance of the resistance 23.

As shown in FIG. 3, when the resistance value of the resistance 23 is "10 kΩ", the output voltage amplitude ratio is extremely high in the living finger compare to the gummy finger. This trend continues until a resistance value of "100 kΩ". Furthermore, in a transit from "100 kΩ" to "10 MΩ", the output voltage amplitude ratio of the living finger and the output voltage amplitude ratio of the gummy finger gradually approach to each other.

According to this experimental result, by applying two types of values of resistance, "10 kΩ" and "10 MΩ", to the resistance 23 to detect an output voltage between terminals C and D, whether the test body 41 is alive or a gummy finger can be detected.

In the present embodiment, the gummy finger as the counterfeit finger is explained as an example. Gummy has conducting properties, thus an image of a gummy-made artificial finger can be obtained easily from a fingerprint sensor. This is because, in the biological detection device according to the present embodiment, the gummy finger resembling skin of the living finger is required to be detected as the counterfeit finger.

Figure 4:
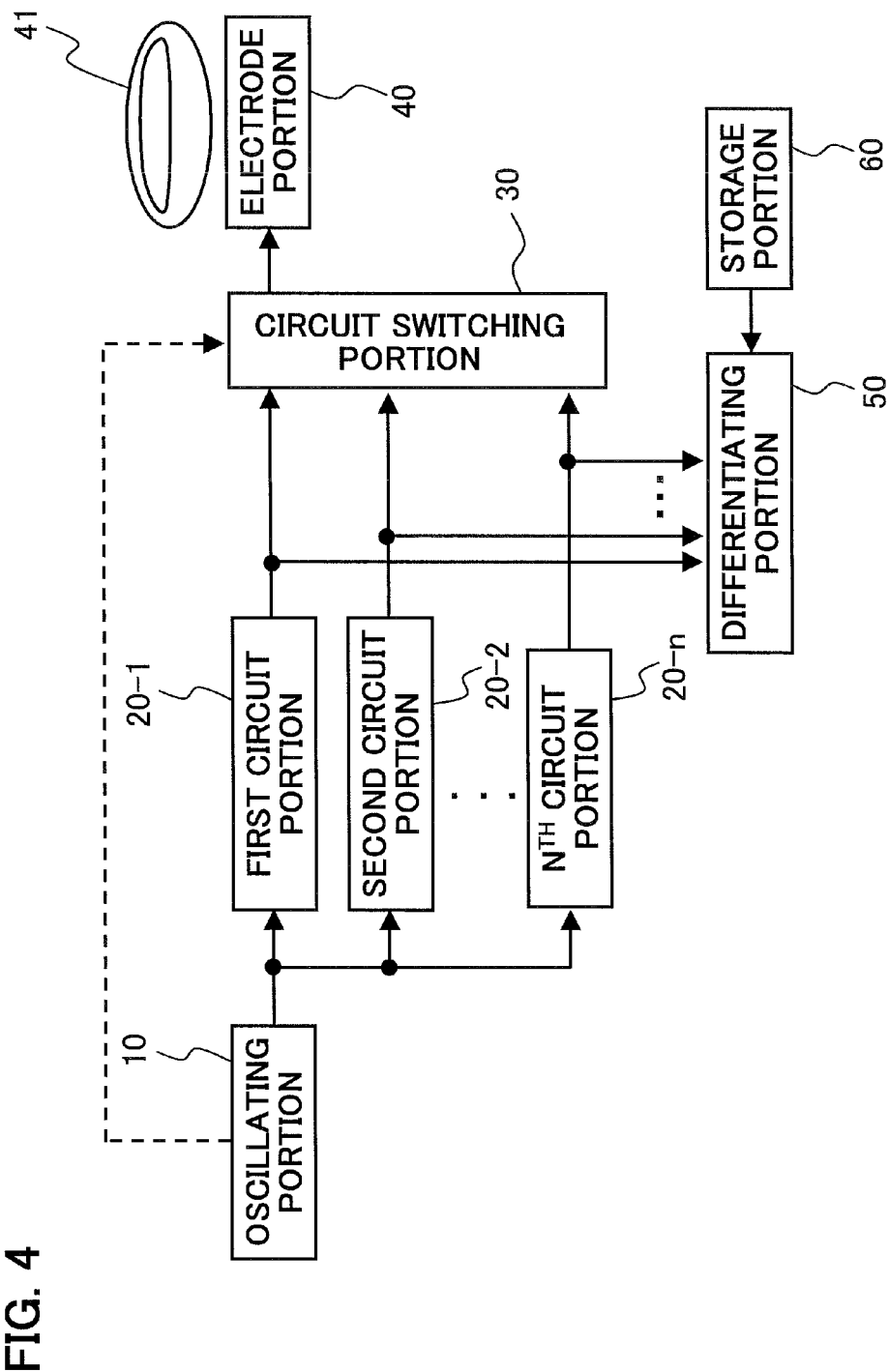
FIG. 4 is a figure showing a configuration example of a biological detection device.

FIG. 4 shows a configuration example of a biological detection device 1 of a first embodiment. The biological detection device 1 has an oscillating portion 10, n numbers of circuit portions 20-1 through 20-$n$ (n is an integer of 2 and above), a circuit switching portion 30, the electrode portion 40, a discriminating portion 50, and a storage portion 60.

The oscillating portion 10 outputs an input voltage having a fixed frequency.

The first through $n^{th}$ circuit portions 20-1 through 20-$n$ is comprised of resistances respectively. Resistance values of the resistances inside the first through $n^{th}$ circuit portions 20-1 through 20-$n$ is different from one another. Each of the first through $n^{th}$ circuit portions 20-1 through 20-$n$ is connected to the oscillating portion 10, and input voltage is applied to these circuit portions from the oscillating portion 10.

The circuit switching portion 30 is connected to each of the circuit portions 20-1 through 20-$n$, and is constituted such that the circuit switching portion 30 switches by selecting one output of any of the first through $n^{th}$ circuit portions 20-1 through 20-$n$. For example, a switch signal is input to the circuit switching portion 30 from the oscillating portion 10, whereby switching is performed in accordance with the switch signal. The switch signal is output at the time when the oscillating portion 10 outputs the input voltage.

The electrode portion 40 has electrodes for applying a voltage to the test body 41. The electrode portion 40 is connected to the circuit switching portion 30 and applies the input voltage, which is output from the oscillating portion 10, to the test body 41 via any one of the first through $n^{th}$ circuit portions 20-1 through 20-$n$.

The discriminating portion 50 is connected to each output of each of the first through $n^{th}$ circuit portions 20-1 through 20-$n$, and compares the output of the first through $n^{th}$ circuit portions 20-1 through 20-$n$ with data stored in the storage portion 60 to discriminate whether the test body 41 is the living finger or the gummy finger. In accordance with which one of the circuit portions 20-1 through 20-$n$ the input voltage to be applied to the test body 41 is applied through, a different value of the voltage reaching the discriminating portion 50 is obtained.

Figure 5:
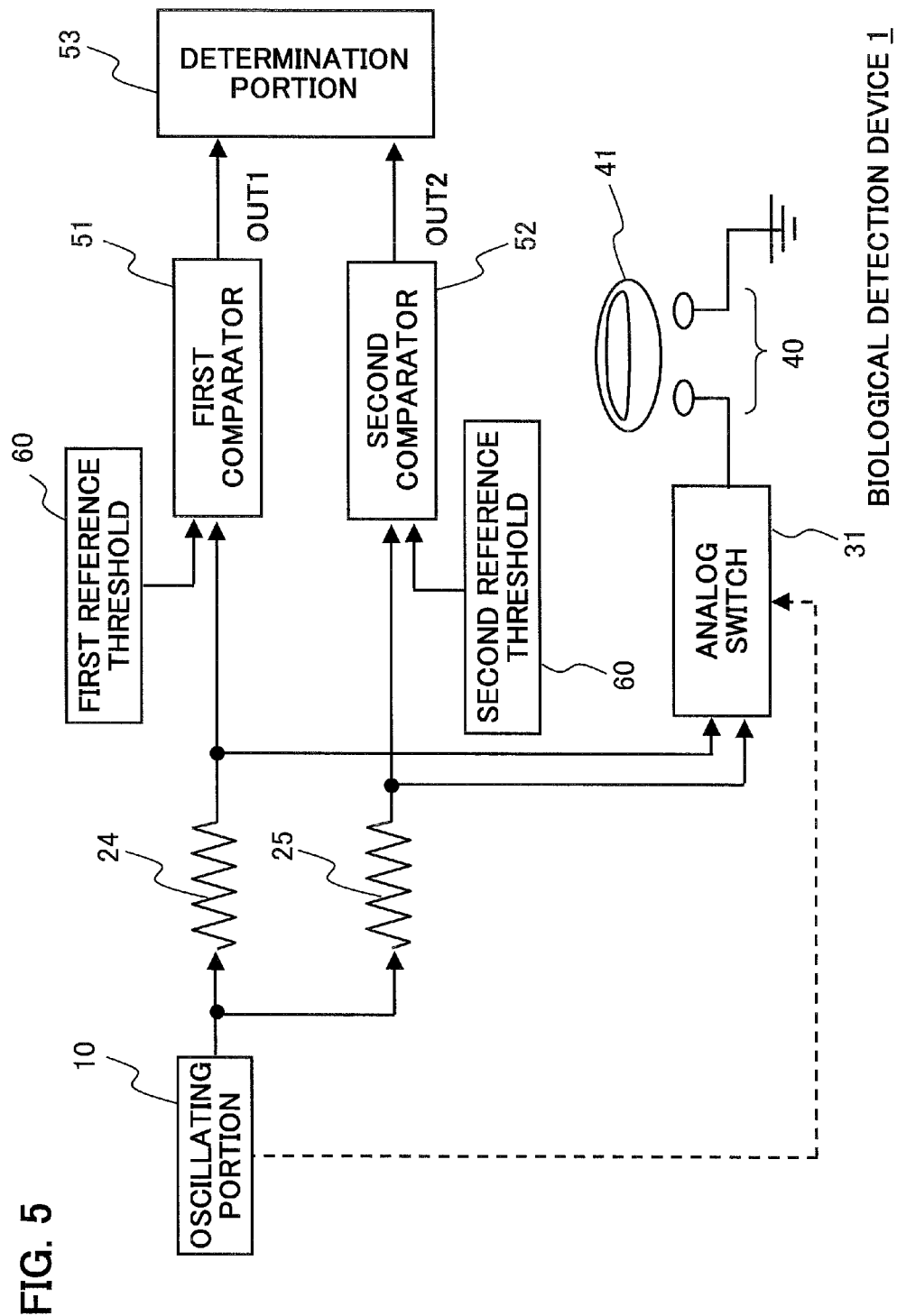
FIG. 5 is a figure showing a concrete configuration example of the biological detection device.

FIG. 5 shows a concrete configuration example of the biological detection device 1. In comparison to FIG. 4, the circuit portions 20-1 through 20-$n$ are constituted by two circuit portions, 20-1 and 20-2, and the circuit portions 20-1 and 20-2 are constituted by a first resistance portion 24 and a second resistance portion 25 respectively.

Furthermore, the circuit switching portion 30 is constituted by an analog switch 31, and the discriminating portion 50 is constituted by a first comparator 51, a second comparator 52, and a determination portion 53. Furthermore, the electrode portion 40 has two electrodes, one of which is grounded. A first reference threshold and a second reference threshold are stored in the storage portion 60.

The analog switch 31 switches between an output stage of the first resistance portion 24 and an output stage of the second resistance portion 25 alternately in response to a switch signal from the oscillating portion 10. Therefore, an input voltage, which is output from the oscillating portion 10, is output to the electrode portion 40 via either one of the first resistance portion 24 or the second resistance portion 25.

The first resistance portion 24 is used by a resistance for determining finger placement, and the resistance value thereof is set to "10 MΩ", while the second resistance portion 25 is used by a resistance for determining gummy finger placement, and the resistance value thereof is set to "10 kΩ".

The first comparator 51 connected to the first resistance portion 24 has a function of detecting whether or not the living finger is placed on the electrode portion 40. The second comparator 52 connected to the second resistance portion 25 has a function of detecting whether or not the gummy finger, which is the counterfeit finger, is placed on the electrode portion 40. The first and second comparators 51 and 52 compare the first reference threshold and the second reference threshold to a detected voltage. If the detected voltage is higher than the reference thresholds, outputs OUT1 and OUT2 both become "1". On the other hand, if the detected voltage is lower than the reference thresholds, the outputs OUT1 and OUT2 both become "0".

The first reference threshold stored in the storage portion 60 is input to the first comparator 51, and, similarly, the second reference threshold stored in the storage portion 60 is input to the second comparator 52.

FIG. 6A and FIG. 6B show examples of a voltage detected by each of the comparators 51 and 52. The operation of the biological detection device 1 shown in FIG. 5 is explained using these figures.

First, a case in which the test body 41 is not placed on the electrode portion 40 is considered. In this case, the electrode portion 40 is opened, and even when an input voltage is output to the electrode portion 40 via the first resistance portion 24 by switching of the analog switch 40 and the input voltage is output to the electrode portion 40 via the second resistance portion 25, in either case the input voltages are input to the first and second comparators 51 and 52 substantially directly since the electrode portion 40 is opened.

Therefore, as shown in FIG. 6A and FIG. 6B, each of the comparators 51 and 52 detects each input voltage at the time of "opened state" of the electrode portion 40.

At this case, each of the comparators 51 and 52 compares the detected voltage with each of the reference thresholds. If each of the reference thresholds is as shown with the dashed lines in FIG. 6A and FIG. 6B, each of the comparators 51 and 52 detects a voltage which is higher than each of the reference thresholds. Therefore, the output values OUT1 and OUT2 which are output from the comparators 51 and 52 respectively become "1".

Next, a case in which the living finger is placed on the electrode portion 40 is considered. In the present embodiment, the living finger is also constituted with one circuit of the present biological detection device 1, and the resistance value of the living finger is taken as, for example, "1 MΩ".

First, the switching is performed by the analog switch 31 so that an input voltage is output to the electrode portion 40 via the first resistance portion 24. At this case, the first resistance portion 24 has a resistance value of "10 MΩ" and the living finger has a resistance value of "1 MΩ": the both resistance values are extremely large.

Therefore, the first comparator 51 detects a voltage approximate to "0" with respect to the input voltage. Specifically, if the living finger is placed, the first comparator 51 detects a voltage approximate to "0".

Hence, as shown in FIG. 6A, in the case of "living finger", the first comparator 51 detects a voltage lower than the first reference threshold. As the output OUT1, "0" is output from the first comparator 51.

On the other hand, if the switching is performed by the analog switch 31 so that an input voltage is output to the electrode portion 40 via the second resistance portion 25, the following occurs. Specifically, the second resistance portion 25 has a resistance value of "10 KΩ" and the living finger has a resistance value of "1 MΩ": the resistance of the living finger is extremely large compared to that of the second resistance portion 25. In the second comparator 52, a substantially the same state as the "opened" state is obtained, and a voltage which is almost the same as the input voltage is detected.

Therefore, as shown in FIG. 6B, in the case of "living finger", the second comparator 52 detects a voltage larger than the second reference threshold. Hence, the output OUT2 from the second comparator 52 becomes "1".

Finally, a case in which the gummy finger is placed on the electrode portion 40 is considered. It is supposed that the gummy finger has a resistance value which is lower than that of the living finger. In the present embodiment, the resistance value of the gummy finger is "10 kΩ".

When the switching is performed by the analog switch 31 so that an input voltage is output to the electrode portion 40 via the first resistance portion 24, the following occurs. Specifically, the first resistance portion 24 has a resistance value of "10 MΩ" and the gummy finger has a resistance value of "10 kΩ": the first resistance portion 24 has an extremely large resistance value. Therefore, the voltage detected by the first comparator 51 is approximate to "0".

Hence, as shown in FIG. 6A, in the case of "counterfeit finger", the first comparator 51 detects a voltage which is lower than the first reference threshold, and the output OUT1 is "0".

On the other hand, when the switching is performed by the analog switch 31 so that an input voltage is output to the electrode portion 40 via the second resistance portion 25, the following occurs. Specifically, the second resistance portion 25 has a resistance value of "10 kΩ" and the gummy finger has a resistance value of "10 kΩ": the both resistance values are same. Therefore, the voltage detected by the second comparator 52 is approximately "0".

Hence, as shown in FIG. 6B, in the case of "counterfeit finger", the second comparator 52 detects a voltage of approximately "0", which is lower than the second reference threshold, thus the output OUT2 is "0".

FIG. 6C shows a summary of values of the outputs OUT1 and OUT2 which can be obtained by the comparators 51 and 52 respectively. As shown in FIG. 6C, in the "opened" state in which the test body 41 is not placed on the electrode portion 40, the outputs from the first and second comparators 51 and 52 are both "1". Further, when the "living finger" is placed, the output OUT1 from the first comparator 51 is "0", and the output OUT2 from the second comparator 52 is "1". Moreover, in the case of the "counterfeit finger" in which the gummy finger is placed, the both outputs OUT1 and OUT2 are "0". It should be noted that the values "1" and "0" of the outputs OUT1 and OUT2 respectively are output values that cannot be obtained by these comparators 51 and 52.

Therefore, when the output values of the both outputs OUT1 and OUT2 are "1", the determination portion 53 can determine that it indicates the "opened" state. Further, when the output OUT1 is "0" and the output OUT2 is "1", the determination portion 53 can determine that it indicates the "living finger". Moreover, when the both outputs OUT1 and OUT2 are "0", the determination portion 53 can determine that it indicates the "counter finger".

As described above, in the first embodiment, determination can be made on whether the test body is the living finger or the gummy finger by one oscillating portion 10 and at least two resistances 24 and 25. Further, switching of the resistances is carried out by the analog switch 31, thus a plurality of the oscillating portion 10 or control circuits for performing the switching and the like are not required, and reduction of the costs and miniaturization of the biological detection device 1 can be achieved.

Furthermore, each of the comparators 51 and 52 outputs the output value by simply comparing the detected voltage with the reference thresholds, and the determination portion 53 determines whether the test body is the living finger or gummy finger in accordance with thus obtained output values. Therefore, no complicated computation or the like needs to be carried out, whereby the processing time can be reduced.

It should be noted that in the first embodiment, the example shown in FIG. 5 shows that the circuit portions 20-1 and 20-2 are constituted by the two resistance portions 24 and 25. Of course, as shown in FIG. 4, the circuit portions 20-1 through 20-n may be constituted by three or more resistance portions. In such a case, the resistance value of each resistance may be, as shown in FIG. 3 for example, taken within the range of "resistance values". By applying input voltages to the test body 41 via a plurality of resistances and allowing each of the comparators 51 and 52 to detect the detected voltages, whether the test body 41 is the living finger or the gummy finger can be detected. Accordingly, the security performance can be further improved.

The first embodiment describes that the resistance value of the first resistance portion 24 is "10 MΩ" and the resistance value of the second resistance portion 25 is "10 kΩ" according to the experimental result shown in FIG. 3. This is merely an example, thus, of course, any value is possible as long as the resistance value of the first resistance portion 24 is larger than the resistance value of the second resistance portion 25.

Moreover, the first embodiment describes that the resistance of the living finger is "1 MΩ" and the resistance of the gummy finger is "10 KΩ". This is also merely an example, thus any value is possible as long as the resistance value of the living finger is larger than the resistance value of the gummy finger.

Figure 7A:
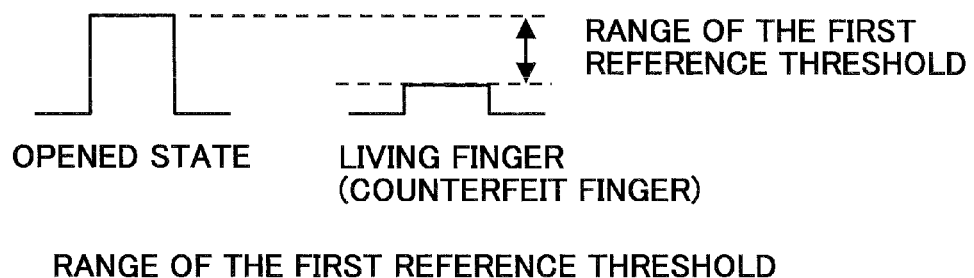
FIG. 7A and FIG. 7B are figures showing examples of ranges of reference thresholds.
Figure 7B:
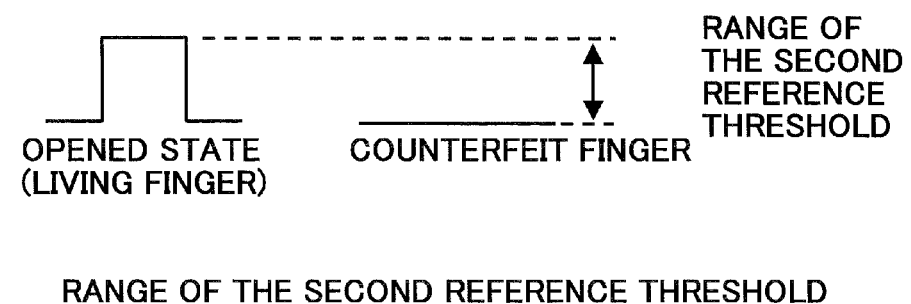

It should be noted that the first and second reference thresholds described above are stored in the storage portion 60 as follows. FIG. 7A and FIG. 7B are schematic diagrams in this regard.

As shown in FIG. 7A, the first comparator 51 detects a voltage at the time of "opened state", and, when the "living finger" (or "counterfeit finger") is placed, detects other voltage lower than the voltage at the time of "opened state". Therefore, each of the voltage values is measured in advance, the first reference threshold is determined so that the first reference threshold falls within the range of the values, and then the values are stored in the storage portion 60.

Further, as shown in FIG. 7B, the second comparator 52 detects a voltage at the time of "opened state" (or when the "living finger" is placed), and, when the "counterfeit finger" is placed, detects a voltage of approximately "0". Therefore, each of the voltage values is measured, the second reference threshold is determined so that the second reference threshold falls within the range of the values, and then the values are stored in the storage portion 60.

Figure 8:
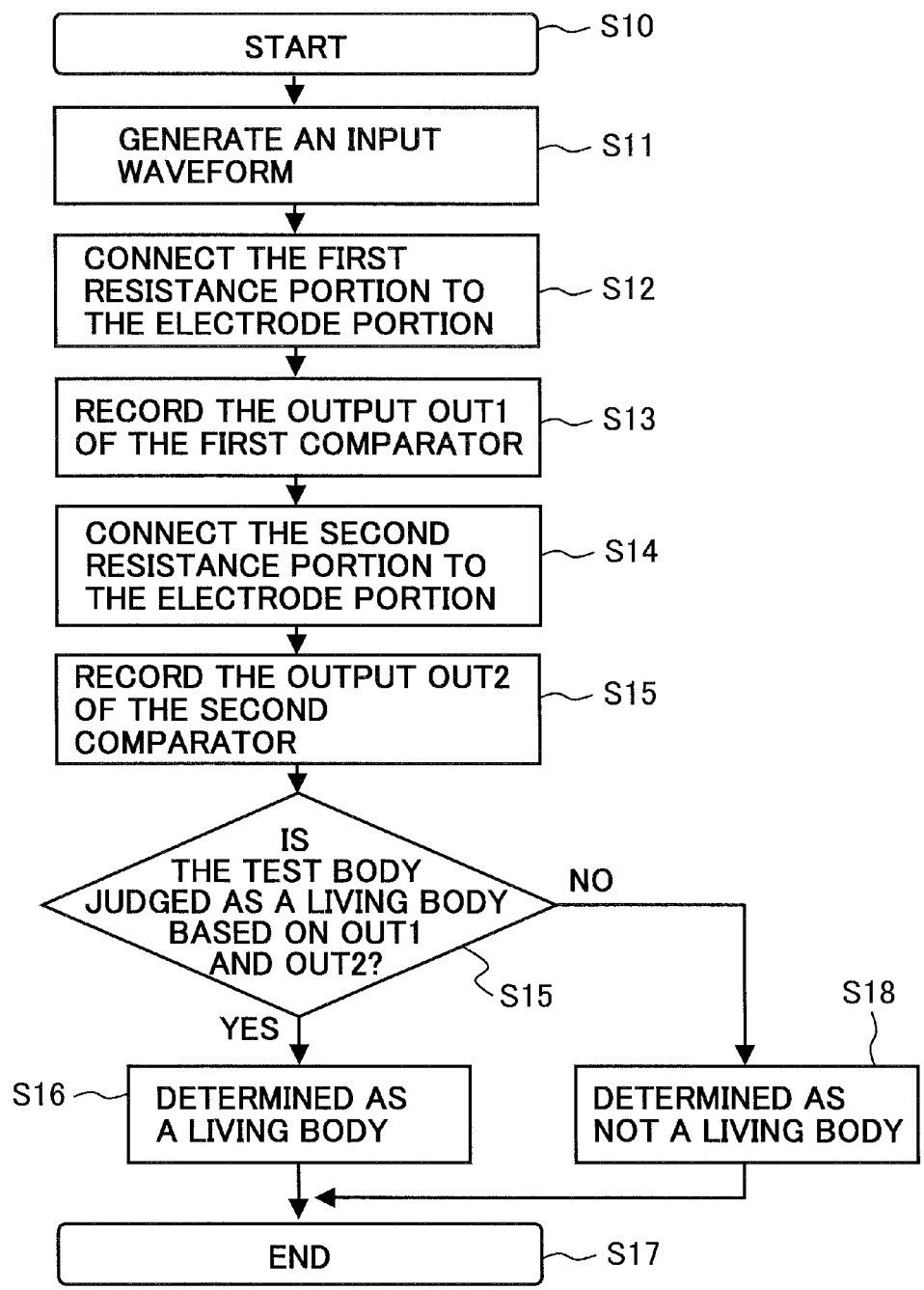
FIG. 8 is a flowchart showing an operation of a process.

FIG. 8 is an example of a flowchart showing an operation of a process in the first embodiment. First, when the process is started (S10), the oscillating portion 10 generates an input waveform and outputs an input voltage (S11).

Next, the first resistance portion 24 is connected to the electrode portion 40 by the analog switch 31 (S12). At this case, the first comparator 51 detects the abovementioned voltage, compares the voltage with the first reference threshold, and outputs the output OUT1. The determination portion 53 stores the output OUT1 in a memory or the like provided therein (S13).

Next, the second resistance portion 25 is connected to the electrode portion 40 by the analog switch 31 (S14). At this case, the second comparator 52 detects the abovementioned voltage, compares the voltage with the second reference threshold, and outputs the output OUT2. The determination portion 53 stores the output OUT2 in the memory or the like provided therein (S15).

Thereafter, the determination portion 53 judges from the outputs OUT1 and OUT2 whether the test body is the living body or not (S15). In the above example, when the outputs OUT1 and OUT2 are "0" and "1" respectively (YES), it is determined that the test body is the living body (S16), and when the outputs OUT1 and OUT2 are other than those values (NO in S15), it is determined that the test body is not the living body. Accordingly, the series of process ends (S17).

Figure 9:
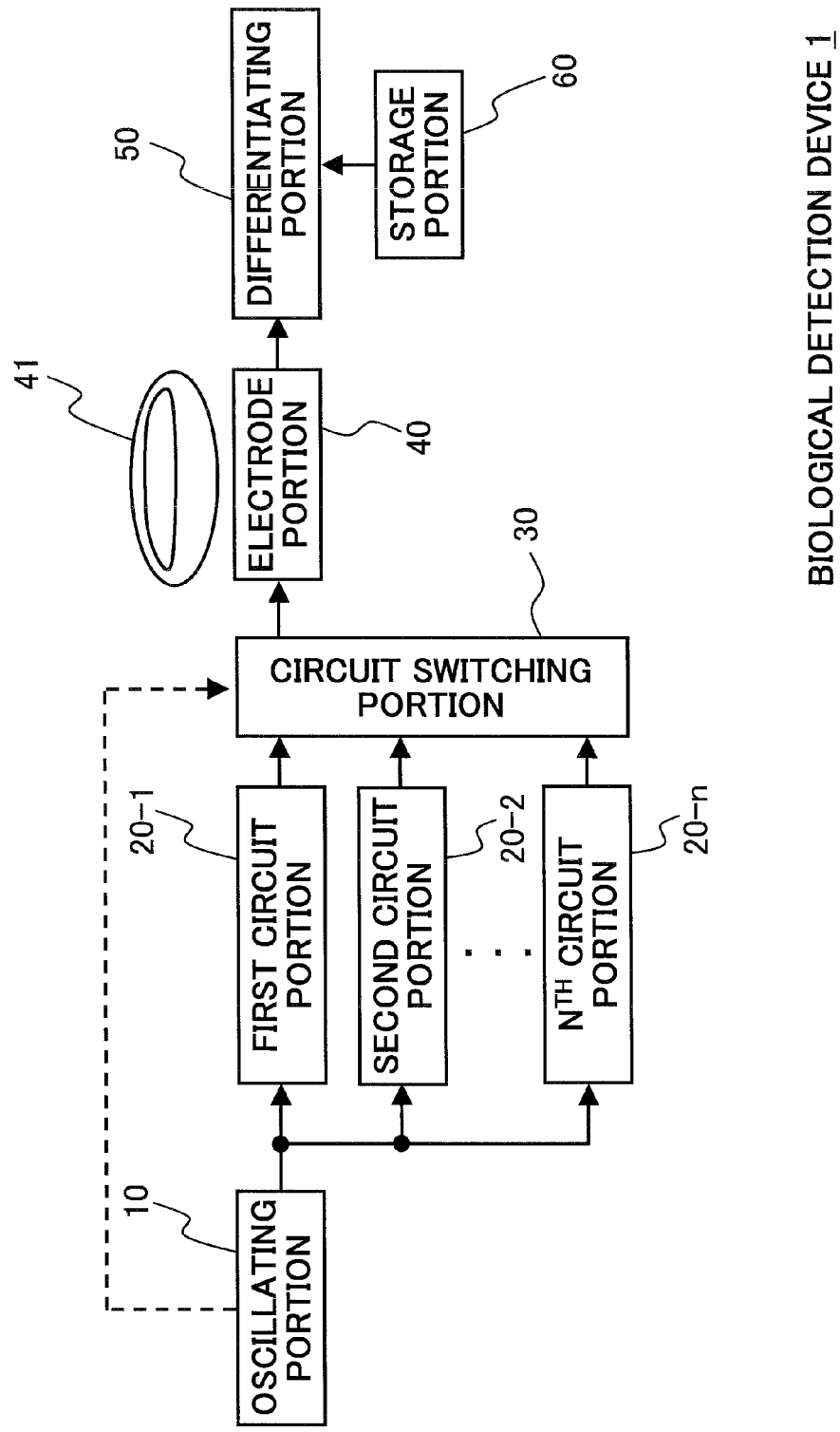
FIG. 9 is a figure showing other configuration example of the biological detection device.

Other example is described next. FIG. 9 shows a configuration example of the biological detection device 1 of a second embodiment. This is an example in which the discriminating portion 50 is provided in a subsequent step of the electrode portion 40. By the circuit switching portion 30, the input voltage from the oscillating portion 10 is applied to the test body 41 from the electrode portion 40 via any one of the first through $n^{th}$ circuit portions 20-1 through 20-n, and an output thus obtained from application of the input voltage is detected by the discriminating portion 50. The operation of this example is same as the example described above, and thus the same operations and effects are achieved.

Figure 10:
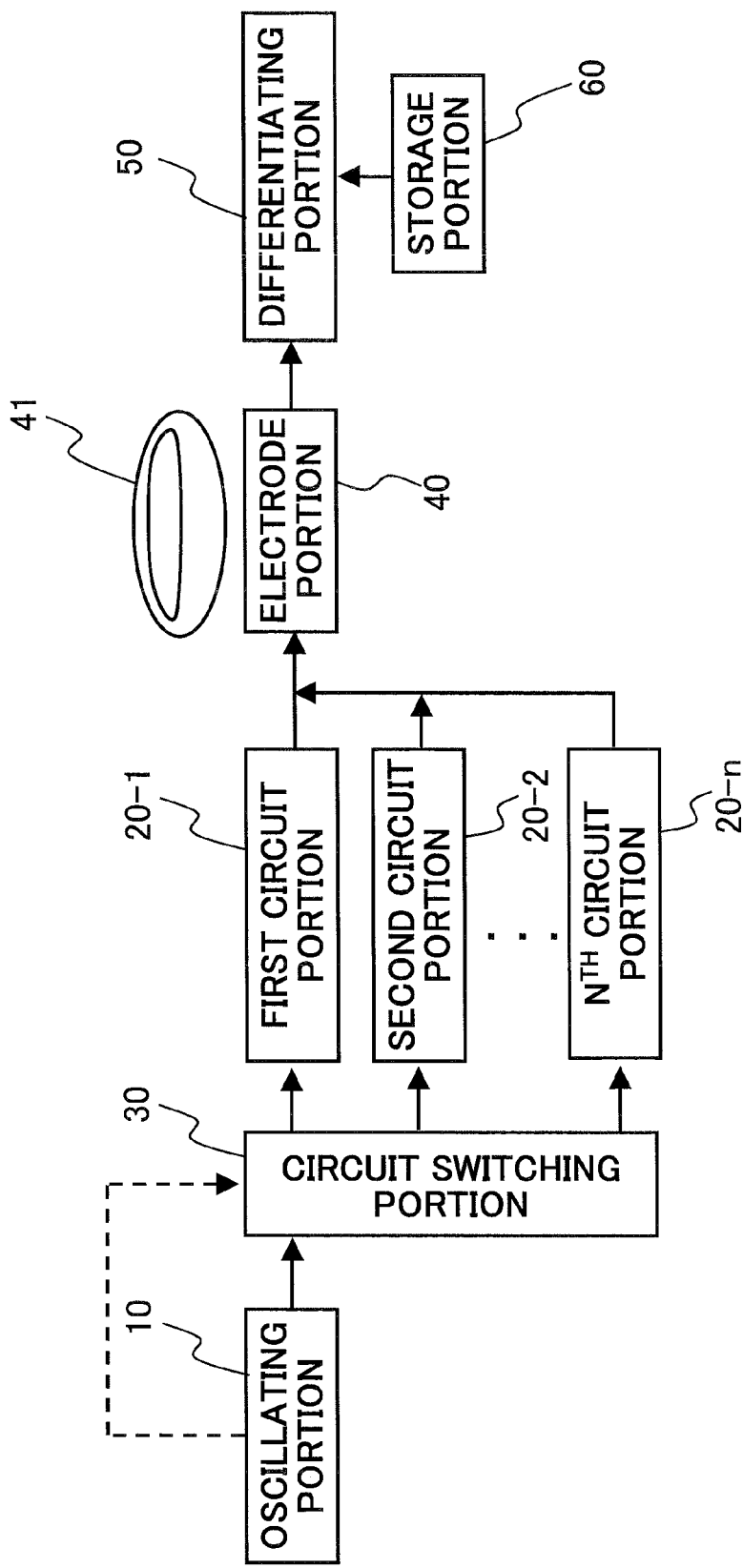
FIG. 10 is a figure showing other configuration example of the biological detection device.

FIG. 10 shows a configuration example of the biological detection device 1 of a third embodiment. This is an example in which the circuit switching portion 30 is provided between the oscillating portion 10 and each of the circuit portions 20-1 through 20-n. The operation of this example is same as the examples of the first and second embodiments, and thus the same operations and effects are achieved.

Figure 11:
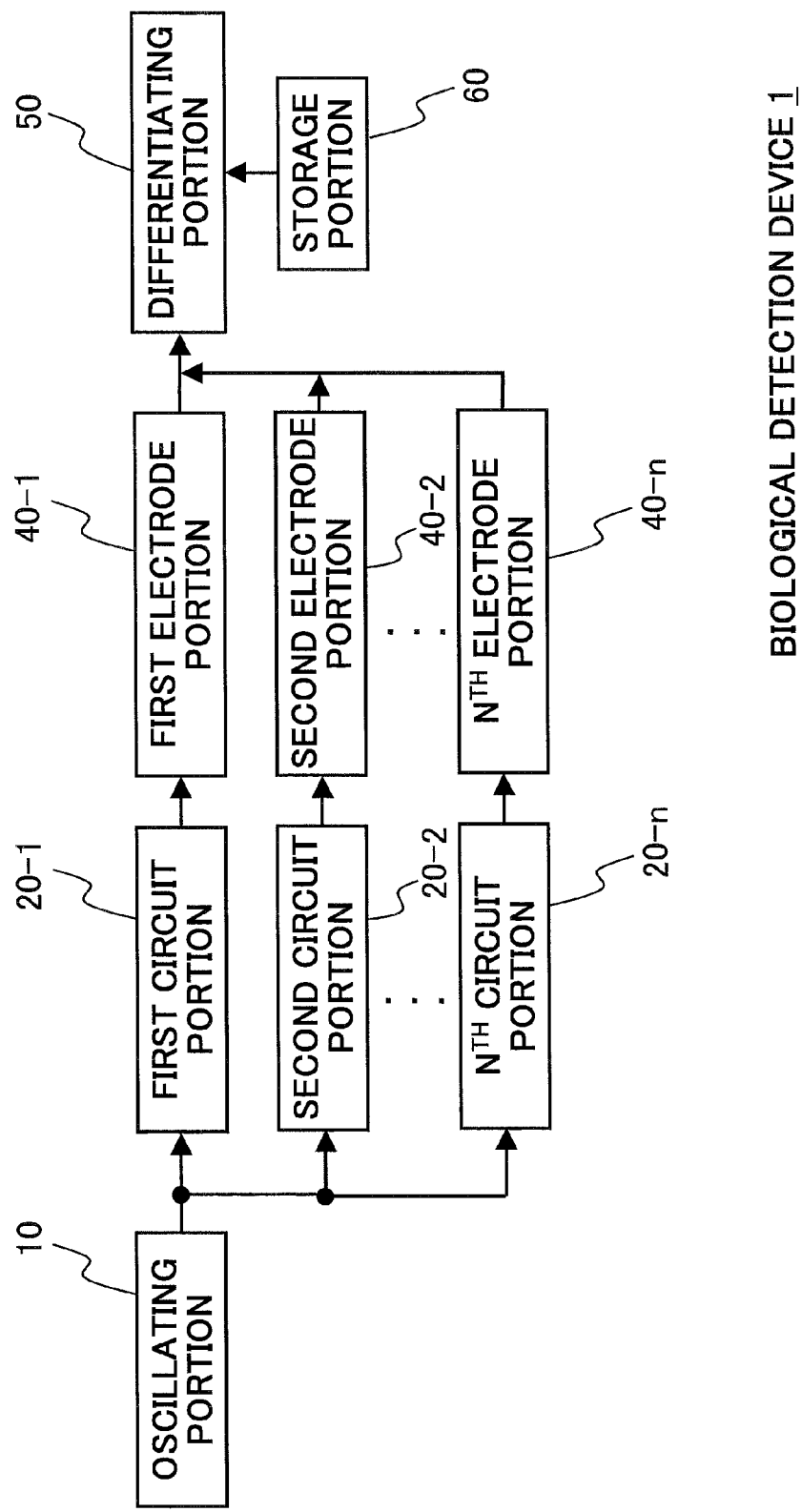
FIG. 11 is a figure showing other configuration example of the biological detection device.

FIG. 11 shows a configuration example of the biological detection device 1 of a fourth embodiment. This is an example in which electrode portions 40-1 through 40-n are provided separately instead of the circuit switching portion 30. Specifically, this is an example in which the first electrode portion 40-1 is provided on an output stage of the first circuit portion 20-1, the second electrode portion 40-2 is provided on an output stage of the second circuit portion 20-2, and the $n^{th}$ electrode portion 40-n is provided on an output stage of the $n^{th}$ circuit portion 20-n. The discriminating portion 50 compares each of output voltages of the electrode portions 40-1 through 40-n with the data (reference thresholds) stored in the storage portion 60, and detects whether or not the test body is the living finger or gummy finger, as in the first embodiment and the like.

The biological detection device 1 of the present example can detect whether the test body is the living finger or the counterfeit finger at one timing, without requiring the circuits to be switched by the circuit switching portion 30. Therefore, the processing time can be reduced more in comparison with the first embodiment. Other operations are substantially the same as those of the first embodiment, and thus the same operations and effects are achieved.

Figure 12:
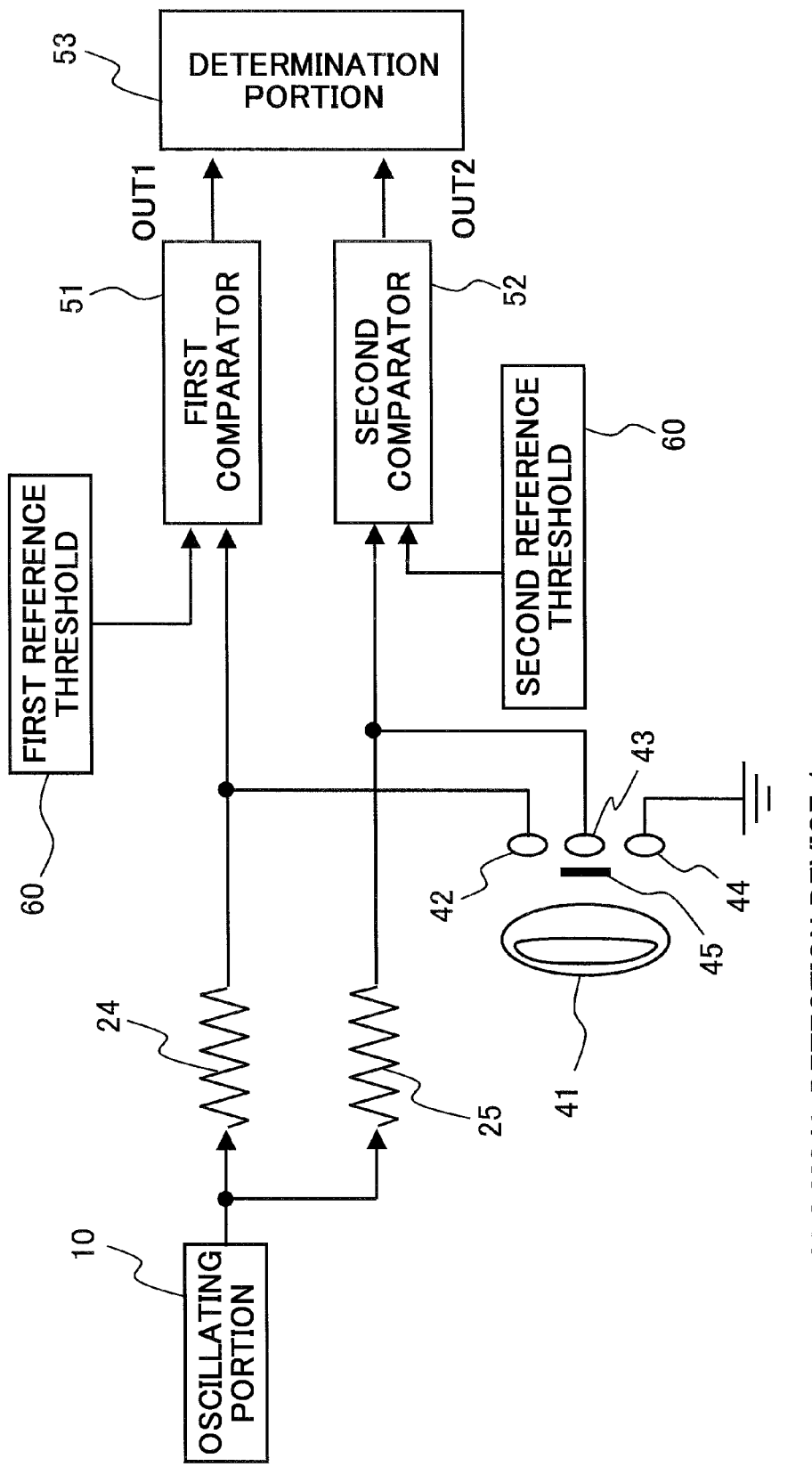
FIG. 12 is a figure showing other concrete configuration example of the biological detection device.

FIG. 12 shows a concrete configuration example of the biological detection device 1 of the fourth embodiment. The two circuit portions 20-1 and 20-2 are constituted as the first resistance portion 24 and the second resistance portion 25 respectively, and the first electrode portion 40-1 is constituted by electrodes 42 and 44 while the second electrode portion 40-2 is constituted by electrodes 43 and 44.

Although the number of electrodes increases compared to the above example, it is not required to provide the analog switch 31. Therefore, in comparison to the above example, reduction of the costs and miniaturization of the device can be achieved since the analog switch 31 is not provided. The operation is same as the first embodiment, and thus the same operations and effects are achieved.

In the fourth embodiment shown in FIG. 12, for example, there is a case in which an unauthorized intruder covers the electrode 43 with an insulating material 45 (a sealing material, for example). In this case, the electrode 43 is in an opened state at all times, and the output OUT2 of the second comparator 52 is "1" constantly. Since the second comparator 52 is a comparator for detecting the gummy finger, the second comparator 52 cannot detect whether the gummy finger is placed on the electrode 43 or 44, because of the insulating material 45.

Therefore, in a next fifth embodiment, a role is provided to each of the plurality of electrodes to reliably detect whether the test body is the living finger or the gummy finger, even when any of the electrodes is covered by the insulating material 45.

Figure 13:
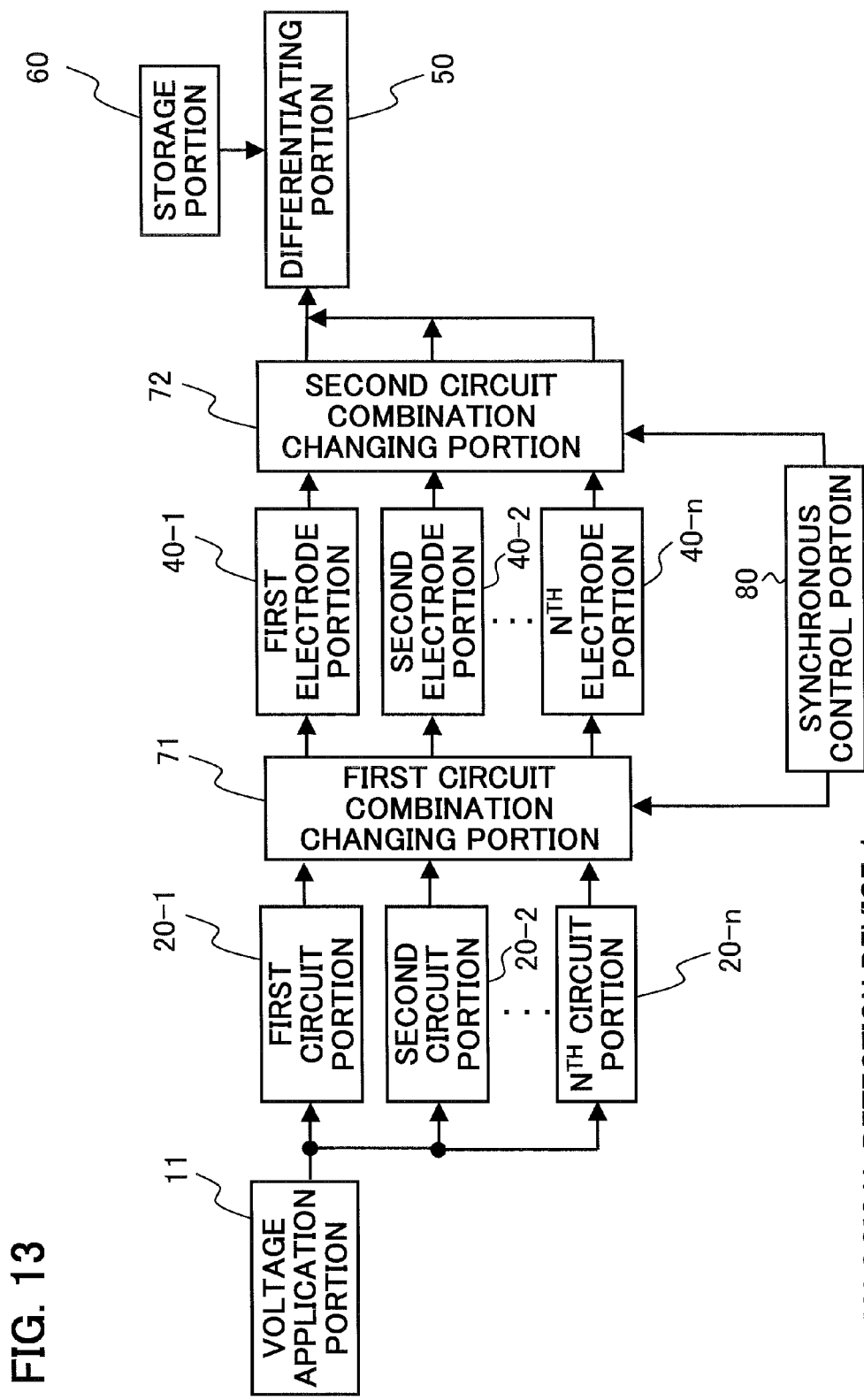
FIG. 13 is a figure showing other configuration example of the biological detection device.

FIG. 13 shows a configuration example of the biological detection device 1 of the fifth embodiment. A first circuit combination changing portion 71 is provided between the circuit portions 20-1 through 20-*n* and the electrode portions 40-1 through 40-*n*, a second circuit combination changing portion 72 is provided between the electrode portions 40-1 through 40-*n* and the discriminating portion 50, and switching between input and output of each of the circuit combination changing portions 71 and 72 is performed synchronously by a synchronous control portion 80.

Figure 14:
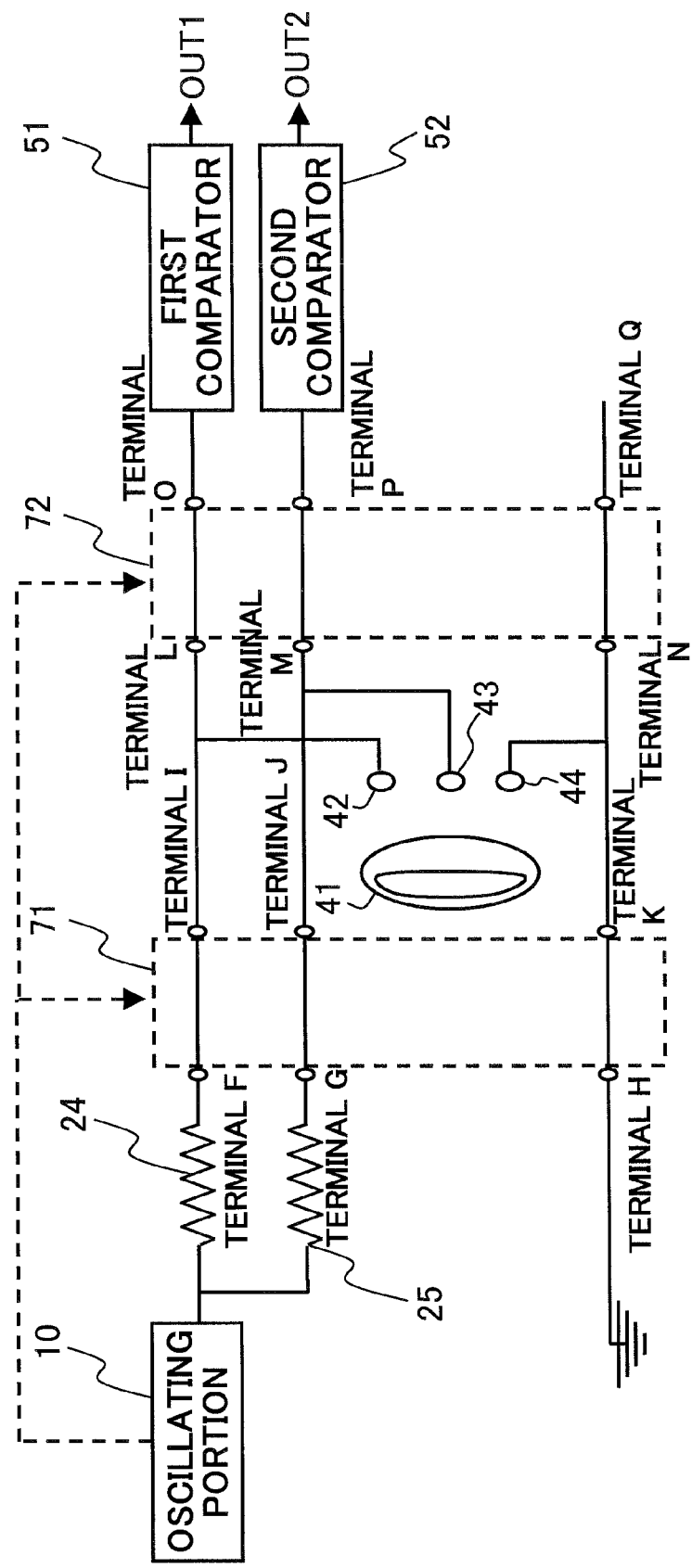
FIG. 14 is a figure showing other concrete configuration example of the biological detection device.

FIG. 14 shows a concrete configuration example of the biological detection device 1 of the fifth embodiment. The circuit portions 20-1 through 20-*n* are constituted by the two resistance portions (the first resistance portion 24 and second resistance portion 25), and the electrode portions 40-1 through 40-*n* are constituted by the three electrodes 42 through 44 (the first electrode 42, second electrode 43, and third electrode 44).

The first circuit combination changing portion 71 is provided between the two resistance portions 24, 25 and the electrodes 42 through 44, and the second circuit combination changing portion 72 is provided between the electrodes 42 through 44 and the comparators 51, 52. The first circuit combination changing portion 71 and the second circuit combination changing portion 72 respectively have terminals so that input and output can be switched.

As with the first embodiment, the first resistance portion 24 and the first comparator 51 have a function of detecting finger placement, and the second resistance portion 25 and the second comparator 52 have a function of detecting a gummy finger.

In the example shown in FIG. 14, a terminal F and a terminal I of the first circuit combination changing portion 71 are connected, and a terminal L and a terminal O of the second circuit combination changing portion 72 are connected. In this case, an input voltage is applied to the test body 41 via the first resistance portion 24 and the first electrode 42. Then an output voltage is detected by the first comparator 51. The first comparator 51 compares the first reference threshold from the storage portion 60 to the output voltage, and outputs the output OUT1.

In the example shown in FIG. 14, when looking at the first electrode 42, it can be seen that the first electrode 42 is connected to the first comparator 51 and the first resistance portion 24. Therefore, the role of the first electrode 42 is to apply an input voltage to the test body 41 via the first resistance portion 24 and detect an output voltage of the test body 41 by the first comparator 51.

On the other hand, in the first circuit combination changing portion 71, a terminal G and a terminal J are connected, and a terminal M and a terminal P of the second circuit combination changing portion 72 are connected. In this case, an input voltage is applied to the test body 41 via the second resistance portion 25 and the second electrode 43.

When looking at the second electrode 43, it can be seen that the second electrode 43 is connected to the second resistance portion 25 and the second comparator 52. Therefore, the second electrode 43 is an electrode for applying an input voltage to the test body via the second resistance portion 25 and detecting an output voltage from the test body 41 by means of the second comparator 52.

In the case in which combination changing is performed by the circuit combination changing portions 71 and 72 as shown in FIG. 14, even if the third electrode 44 is covered by the insulating material 45, an output voltage of the test body 41 can be detected by the first and second comparators 51 and 52 by the first electrode 42 and the second electrode 43, thus whether the test body 41 is the living finger or the gummy finger can be detected.

Figure 15:
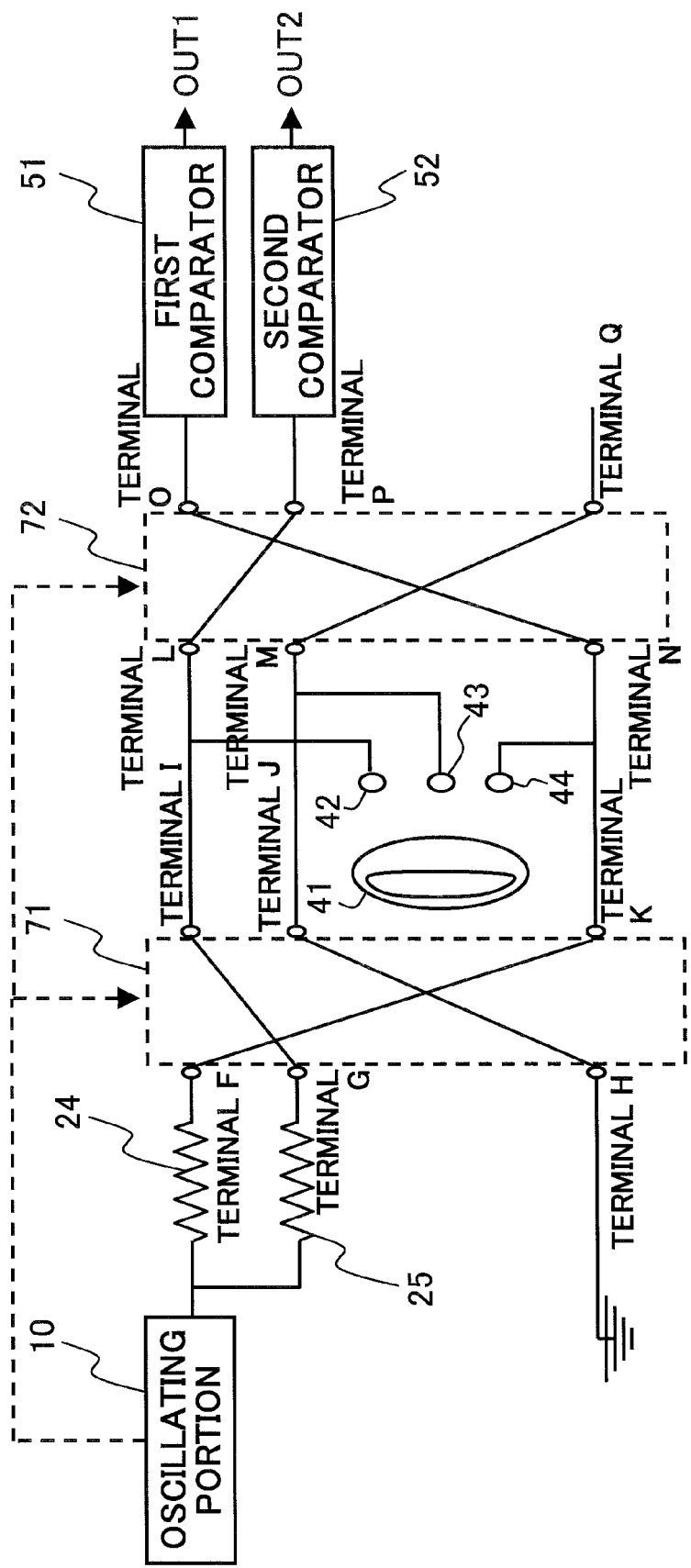
FIG. 15 is a figure showing other concrete configuration example of the biological detection device.

FIG. 15 shows an example in which the combinations of circuits are changed by the first circuit combination changing portion 71 and the second circuit combination changing portion 72. The first circuit combination changing portion 71 connects the terminal F to a terminal K, the terminal G to the terminal I, and a terminal H to the terminal J. Further, the second circuit combination changing portion 72 connects the terminal L to the terminal P, the terminal M to a terminal Q, and a terminal N to the terminal O.

An input voltage from the oscillating portion 10 is output to the first comparator 51 via the first resistance portion 24 as in the example described above, but the third electrode 44 is connected to the first resistance portion 24 and the first comparator 51. Specifically, the third electrode 44 plays a role of allowing the input voltage to be applied to the test body 41 via the first resistance portion 24 and detecting an output voltage by means of the first comparator 51.

On the other hand, the input voltage from the oscillating portion 10 is output to the second comparator 52 via the second resistance portion 25. The first electrode 42 is connected to the second resistance portion 25 and the second comparator 52. Therefore, the first electrode 42 plays a role of applying the input voltage to be applied to the test body 41 via the second electrode 25 and detecting an output voltage by means of the second comparator 52.

In the case of an example shown in FIG. 15, even if the second electrode 43 is covered by the insulating material 45, the first electrode 42 and the third electrode 44 are connected to the second comparator 52 and the first comparator 51 respectively, thus whether the test body 41 is the living finger or the gummy finger can be detected in each of the comparators 51 and 52.

Figure 16:
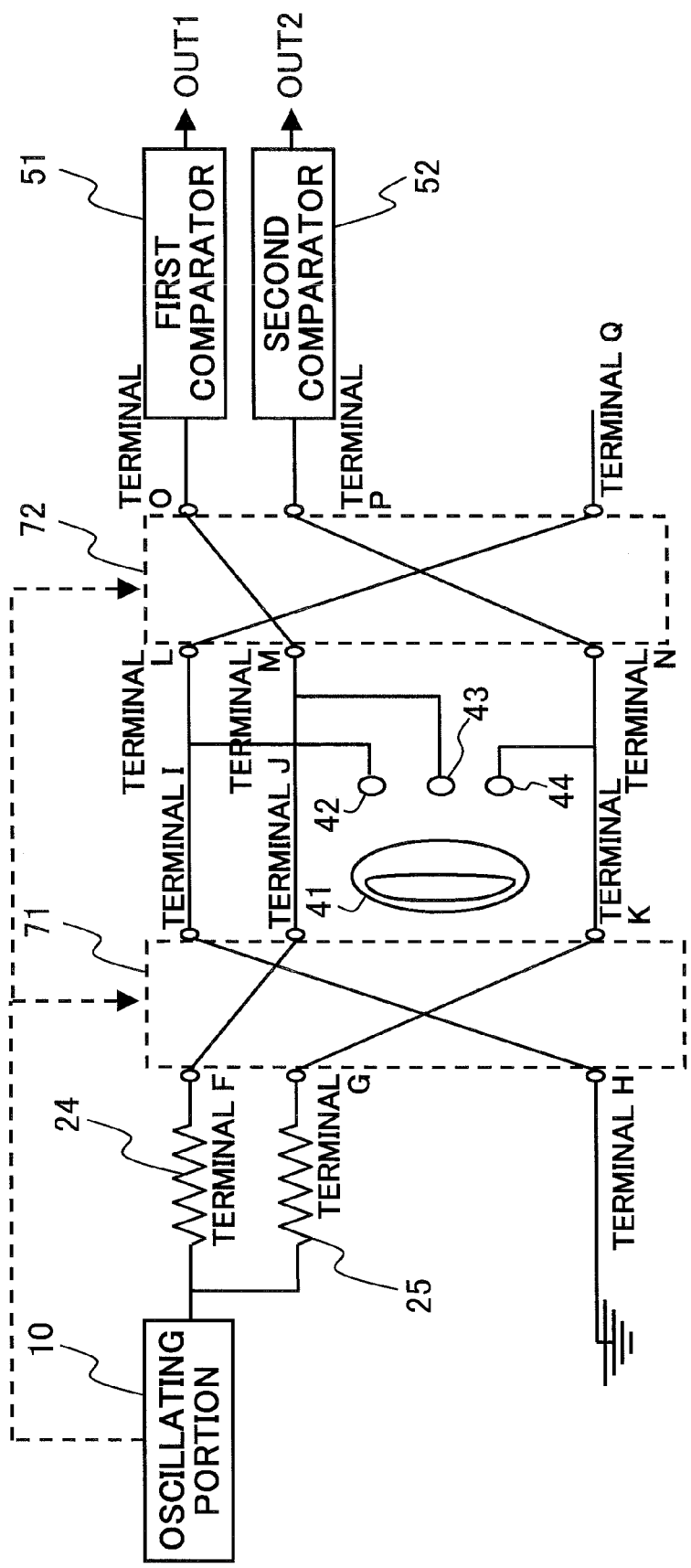
FIG. 16 is a figure showing other concrete configuration example of the biological detection device.

FIG. 16 shows an example in which the combination of the first and second circuit combination changing portions 71 and 72 is further changed by the first and second circuit combination changing portions 71 and 72. The first circuit combination changing portion 71 connects the terminal F to the terminal J, the terminal G to the terminal K, and the terminal H to the terminal I. The second circuit combination changing portion 72 connects the terminal L to the terminal Q, the terminal M to the terminal O, the terminal N to the terminal P.

The second electrode 43 is connected to the first resistance portion 24 and the first comparator 51, and the third electrode 44 is connected to the second resistance portion 25 and the second comparator 52.

Therefore, the second electrode 43 plays a role of allowing an input voltage to be applied to the test body 41 via the first resistance portion 24 and detecting an output voltage by means of the first comparator 51.

Further, the third electrode 44 plays a role of allowing an input voltage to be applied to the test body 41 via the second resistance portion 25 and detecting an output voltage by means of the second comparator 52.

In the case of the example shown in FIG. 16, even if the first electrode 42 is covered by the insulating material 45, Each of the comparators 51 and 52 can detect whether the test body 41 is the living finger or the gummy finger by the second electrode 43 and the third electrode 44.

The switching performed by the circuit combination changing portions 71 and 72 as shown in FIG. 14 through FIG. 16 are carried out at the time, for example, when the test body 41 is placed on the electrodes 42 through 44. Therefore, by placing the test body 41 on the electrodes 42 through 44 the total of three times, switching of the circuits is performed by the circuit combination changing portions 71 and 72. By changing the combinations of the circuits as shown in FIG. 14 through FIG. 16, whether the test body 41 is the living finger or the gummy finger is detected accurately even if any of the electrodes 42 through 44 is covered by the insulating material 45, hence the security performance can be improved.

It should be noted that the process performed in each of the comparators 51 and 52 is completely same as the processing described in the first embodiment and the like. In this case, comparison between the reference threshold and the detected voltage and other processes are performed by each of the comparators 51 and 52 at the time when changing the combinations of the circuits is performed by the circuit combination changing portions 71 and 72. The synchronous control portion 80 outputs a timing signal obtained as a result of the processes to each of the comparators 51 and 52, and each of the comparators 51 and 52 performs the processes in accordance with the timing signal.

Further, this synchronous control portion 80 can be easily implemented by an oscillator, an operational amplifier, and the like. Therefore, in the fifth embodiment as well, cost reduction can be achieved, and the same operations and effects as with the first embodiment.

Figure 17A:
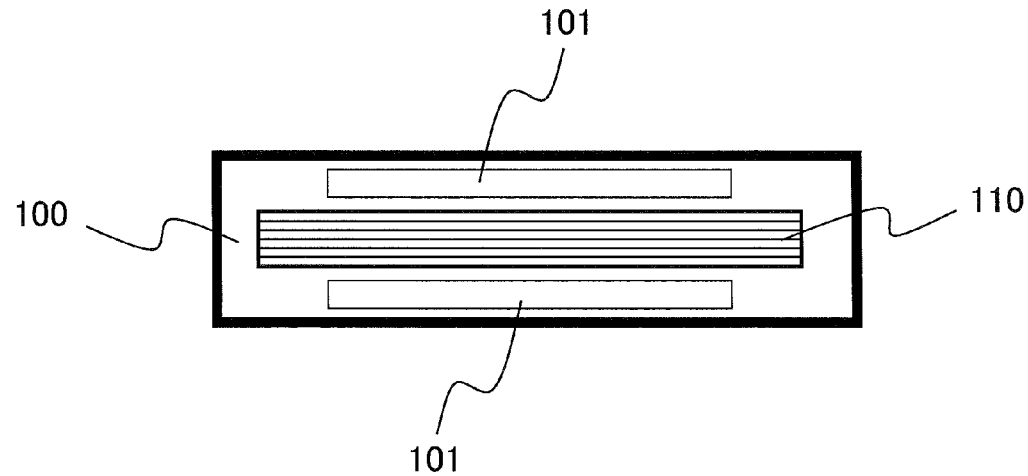
FIG. 17A and FIG. 17B are configuration examples of a fingerprint sensor module.
Figure 17B:
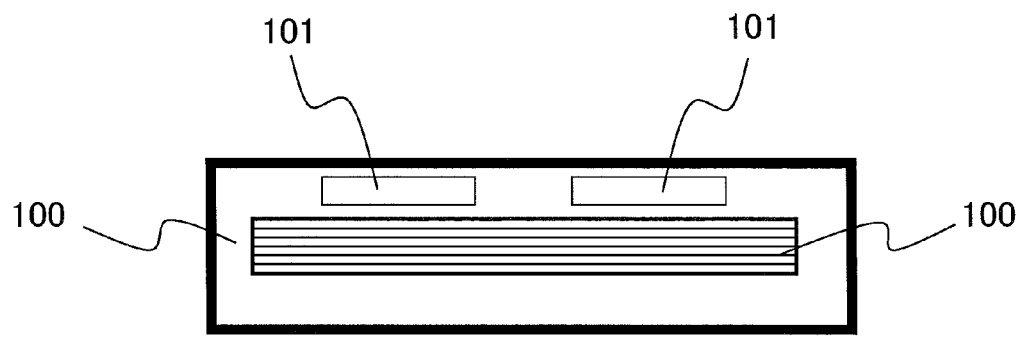

Next, a configuration example of a fingerprint sensor module is explained. FIG. 17A and FIG. 17B show configuration examples of a fingerprint sensor module 100.

The fingerprint sensor module 100 has biological detection electrodes 101 and a fingerprint sensor 110.

The biological detection electrodes 101 correspond to the electrodes constituting the electrode portion 40 described in the first and other embodiments. Furthermore, the fingerprint sensor 110 is constituted so as to capture an image of the test body 41 when the test body 41 is placed on this sensor 110.

The biological detection electrodes 101 shown in FIG. 17A are provided so that the two electrodes 101 have the fingerprint sensor 110 therebetween.

In FIG. 17B as well, two biological detection electrodes 101 are provided, but in this figure they are provided substantially in parallel with an upper end portion of the fingerprint sensor 110.

Figure 18A:
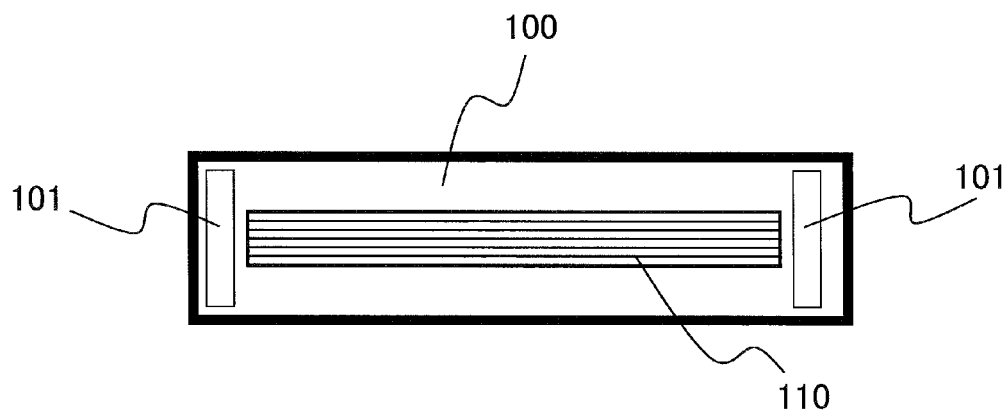
FIG. 18A and FIG. 18B are configuration examples of a fingerprint sensor module.
Figure 18B:
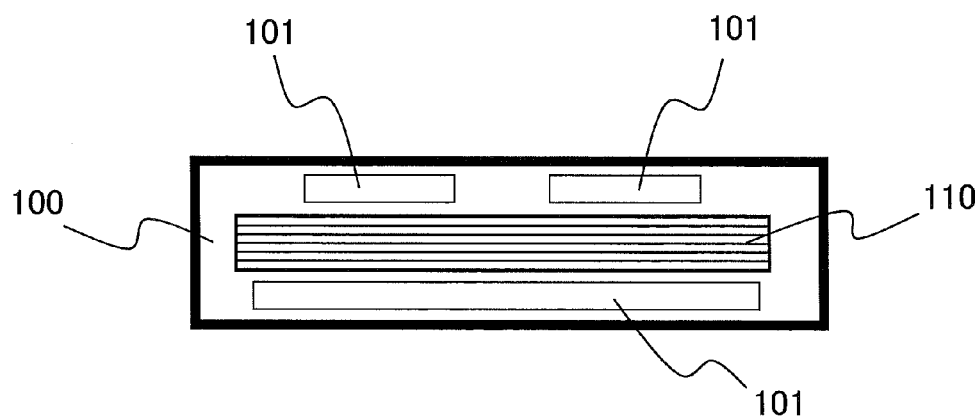

FIG. 18A and FIG. 18B also show a configuration example of the fingerprint sensor module 100.

In FIG. 18A the biological detection electrode 101 is provided on each end of the fingerprint sensor 110, and in FIG. 18B three biological detection electrodes 101 are provided. The example shown in FIG. 18B corresponds to the fourth embodiment.

When the fingerprint authentication device is constituted by this fingerprint sensor 110 and the biological detection device 1, the fingerprint sensor 110 and the biological detection electrodes 101 are integrated to constituted the fingerprint sensor module 100, the security performance can be further improved.

Of course, the fingerprint sensor 110 and the biological detection electrodes 101 may disposed in any fashion as along as they are integrated as the fingerprint sensor module 100 as shown in FIG. 17A and the like.

A fingerprint authentication device 200 provided with the biological detection device 1 is described next. FIG. 19 is a configuration example of the fingerprint authentication device 200.

The fingerprint authentication device 200 has a biological detection portion 210, a biological detection finger placement time storage portion 220, a fingerprint image acquisition portion 230, a fingerprint sensor finger placement time storage portion 240, and a time comparing portion 250.

The biological detection portion 210 corresponds to the biological detection device 1 described above. The biological detection finger placement time storage portion 220 stores time at which the test body 41 is placed on the biological detection portion 210 (biological detection finger placement time).

On the other hand, the fingerprint image acquisition portion 230 acquires an image of the test body 41 which is placed on the fingerprint sensor 110. The fingerprint sensor finger placement time storage portion 240 stores finger placement time for the test body 41 placed on the fingerprint sensor 110 (fingerprint sensor finger placement time).

The time comparing portion 250 reads out the biological detection finger placement time and the finger placement time on the fingerprint sensor from each of the storage portions 220 and 240 and compares the both times, thereby detecting whether the test body 41 is placed on the fingerprint sensor module 100 properly. Specifically, the time comparing portion 250 determines that the test body 41 is placed properly if the biological detection finger placement time and the finger placement on fingerprint sensor time are within a fixed range, and determines that the test body 41 is not placed on the fingerprint sensor module 100 properly if the both times are not within the fixed range.

Therefore, since the fingerprint authentication device 200 has therein the biological detection device 1, the fingerprint authentication device 200 can achieve the operations and effects described in the first and other embodiments. Moreover, by comparing the biological detection finger placement time to the finger placement on fingerprint sensor time, the fingerprint authentication device 200 detects whether or not the test body 41 is placed properly, thus inappropriate actions can be further prevented and the security performance can be further improved.

It should be noted that the biological detection finger placement time storage portion 220 stores, for example, the living finger placement time in the following manners.

Specifically, when the outputs OUT1 and OUT2 are output from the first and second comparators 51 and 52, the biological detection portion 210 outputs "1" and "1" at the time of "opened" state, and outputs "0" and "1", or "0" and "0" when the living finger or the gummy finger is placed (see FIG. 6C). Therefore, the biological detection finger placement time storage portion 220 can perform storage of time by storing a time period between when output values of the outputs OUT1 and OUT2 are output from the biological detection portion 210, and when the output values of "1" and "1" are changed to "1" and "0" (or "0" and "0") and become "1" and "1" again.

Furthermore, the finger placement on fingerprint sensor time can be implemented by, for example, storing a time period between the start and end of capturing the fingerprint image in the fingerprint image capturing portion 230.

Use of the gummy finger as the counterfeit finger is explained in any of the above-described examples. Of course, other than the gummy finger, a counterfeit finger which strongly resembles human skin can be implemented in any of the above embodiments, and the same operations and effects can be still achieved.

Furthermore, the above examples describe the biological detection device 1 in which the storage portion 60 is constituted outside the discriminating portion 50. Of course, the storage portion 60 may be provided inside the discriminating portion 50. In this case as well, any of the above examples can be implemented, and the same operations and effects can still be achieved.

Moreover, in the above examples, the discriminating portion 50 detects the output voltage and the like of the electrode portion 40 and thereby discriminates whether the test body 41 is the living finger or the gummy finger. Other than this example, for instance, the gradient or amplitude of the output voltage may be compared to the reference thresholds stored in the storage portion 60 to detect whether the test body 41 is the living finger or not, as shown in FIG. 1A and FIG. 1B.

In addition, the above examples describe that the biological detection device 1 and the fingerprint authentication device 200 detect and authenticate the fingerprint of the finger. However, for example, a palm or other body parts besides the finger may be detected and authenticated.

What is claimed is:

1. A biological detection device, comprising:
   an oscillating portion which oscillates an input voltage having a specific frequency;
   a plurality of circuit portions each of which is connected to the oscillating portion;
   a plurality of electrode portions each of which applies the input voltage to a test body;
   a first circuit combination changing portion that connects the plurality of circuit portions to the plurality of electrode portions;
   a discriminating portion which discriminates whether the test body is a living body or not, according to an output voltage with respect to the input voltage applied to the test body; and
   a second circuit combination changing portion that connects the plurality of electrode portions to the discriminating portion;
   wherein the first circuit combination changing portion changes connection relation between the plurality of circuit portions and the plurality of electrode portions, and outputs the input voltage output from each of the circuit portions to each of the electrode portions, and
   wherein the second circuit combination changing portion changes connection relation between the plurality of electrode portions and discrimination portion such that all of the output voltages output from plurality of the electrode portions are output in substantial simultaneity, and outputs the output voltage output from each of the electrode portions to the discrimination portion.

2. The biological detection device according to claim 1, wherein the electrode portion has a plurality of electrode portions the number of which is same as the number of the plurality of circuit portions, each of the electrode portions is connected to each of the circuit portions, and the discriminating portion discriminates whether the test body is the living body or not, according to the output voltage with respect to the input voltage applied to the test body via each of the circuit portions and each of the electrode portions respectively.

3. The biological detection device according to claim 1, further comprising a synchronous control portion which synchronizes combination changing of the connection relation performed by the circuit combination changing portion, and discrimination of the output voltage performed by the discriminating portion in response to the combination changing.

4. The biological detection device according to claim 1, further comprising a storage portion which stores a reference threshold, wherein the discriminating portion determines whether the test body is the living body or not by comparing the reference threshold from the storage portion with the output voltage.

5. The biological detection device according to claim 1, wherein the discriminating portion has a counterfeit determination portion which determines whether or not the test body is a counterfeit.

6. The biological detection device according to claim 5, wherein the counterfeit determination portion or the biological determination portion determine whether the test body is the living body or not on the basis of a change in amplitude of the output voltage.

7. The biological detection device according to claim 1, wherein the discriminating portion has a counterfeit determination portion which determines whether or not the test body is a counterfeit, and a biological determination portion which determines whether the test body is the living body or not.

8. The biological detection device according to claim 7, wherein the counterfeit determination portion or the biological determination portion determine whether the test body is the living body or not on the basis of a change in amplitude of the output voltage.

9. The biological detection device according to claim 1, wherein each of the circuit portions is comprised of a resistance.

10. A fingerprint authentication device, comprising:
    a fingerprint sensor which captures an image of a fingerprint of a test body;
    an oscillating portion which oscillates an input voltage having a specific frequency;
    a plurality of circuit portions each of which is connected to the oscillating portion;
    a plurality of electrode portions each of which applies the input voltage to the test body;
    a first circuit combination changing portion that connects the plurality of circuit portions to the plurality of electrode portions;
    a discriminating portion which discriminates whether the test body is a living body or not, according to an output voltage with respect to the input voltage applied to the test body; and
    a second circuit combination changing portion that connects the plurality of electrode portions to the discrimination portion,
    wherein the first circuit combination changing portion changes connection relation between the plurality of circuit portions and the plurality of electrode portions such that all of the output voltages output from plurality of the electrode portions are output in substantial simultaneity, and outputs the input voltage output from each of the circuit portions to each of the electrode portions, and
    wherein the second circuit combination changing portion changes connection relation between the plurality of electrode portions and discrimination portion, and outputs the output voltage output from each of the electrode portions to the discrimination portion.

11. The fingerprint authentication device according to claim 10, wherein the electrode portion and the fingerprint sensor are integrated.

12. A fingerprint authentication device, comprising:
    a fingerprint sensor which captures an image of a fingerprint of a test body;
    a biological detection portion;
    a fingerprint sensor finger placement time storage portion which stores finger placement time for the test body placed on the fingerprint sensor;
    a biological-detection finger placement time storage portion which stores a biological-detection finger placement time for the test body placed on the biological detection portion; and
    a time comparing portion which judges whether or not the test body is properly placed, on the basis of the finger placement on fingerprint sensor time and the biological-detection finger placement time which are stored respectively in the fingerprint sensor finger placement time storage portion and the biological-detection finger placement time storage portion, wherein the biological detection portion comprises:

an oscillating portion which oscillates an input voltage having a specific frequency;

a plurality of circuit portions each of which is connected to the oscillating portion;

an electrode portion which applies the input voltage to the test body;

a circuit switching portion which switches the plurality of circuit portions so as to allow the input voltage to be output to the electrode portion via any one of the circuit portions; and a discriminating portion which discriminates whether the test body is a living body or not, according to an output voltage with respect to the input voltage applied to the test body, and the time comparing portion judges whether the test body is placed properly, when the difference between the finger placement on fingerprint sensor time and the biological-detection finger placement time is within a range of constant values.

13. A biological detection method, comprising the steps of:

oscillating an input voltage having a specific frequency from an oscillating portion;

outputting the input voltage to a plurality of circuit portions;

changing connection relation between the plurality of circuit portions and a plurality of electrode portions, and outputting the input voltage output from each of circuit portions to each of the electrode portions, by a first circuit combination changing portion;

applying the input voltage to a test body, and outputting an output voltage with respect to the input voltage applied to the test body, by each of the electrode portions;

changing connection relation between the plurality of electrode portions and a discrimination portion such that all of the output voltages output from plurality of the electrode portions are output in substantial simultaneity, and outputting the output voltage output from each of the electrode portions to the discrimination portion, by a second circuit combination changing portion; and discriminating whether the test body is a living body or not, according to the output voltage, by the discrimination portion, wherein the first circuit combination changing portion connects the plurality of circuit portions to the plurality of electrode portions, and wherein the second circuit combination changing portion connects the plurality of electrode portions to the discrimination portion.

* * * * *